Figure 13:
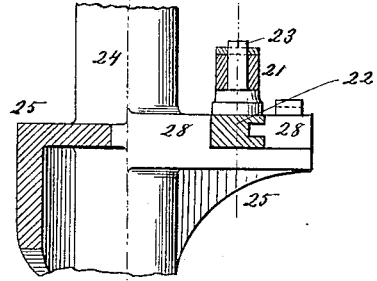

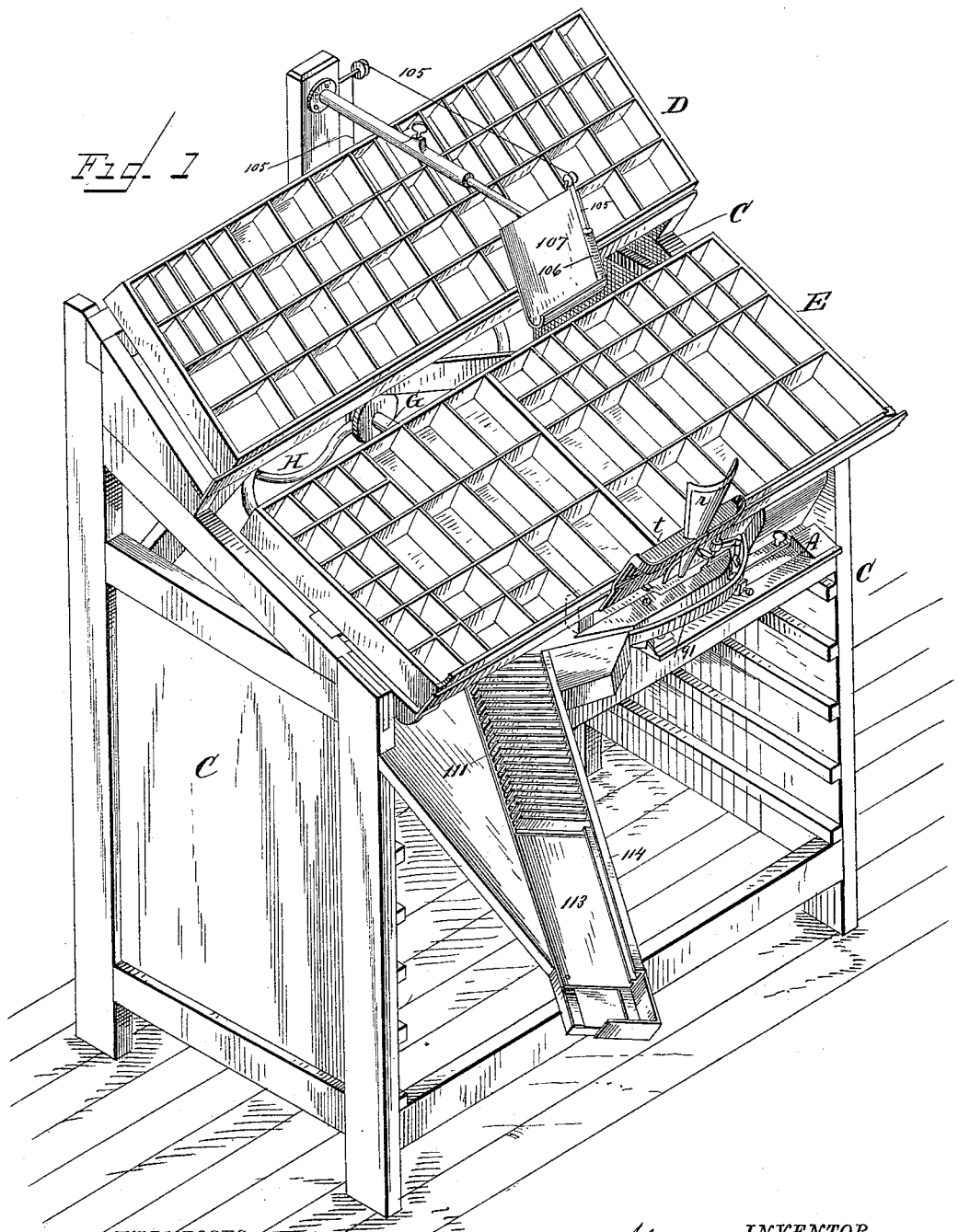

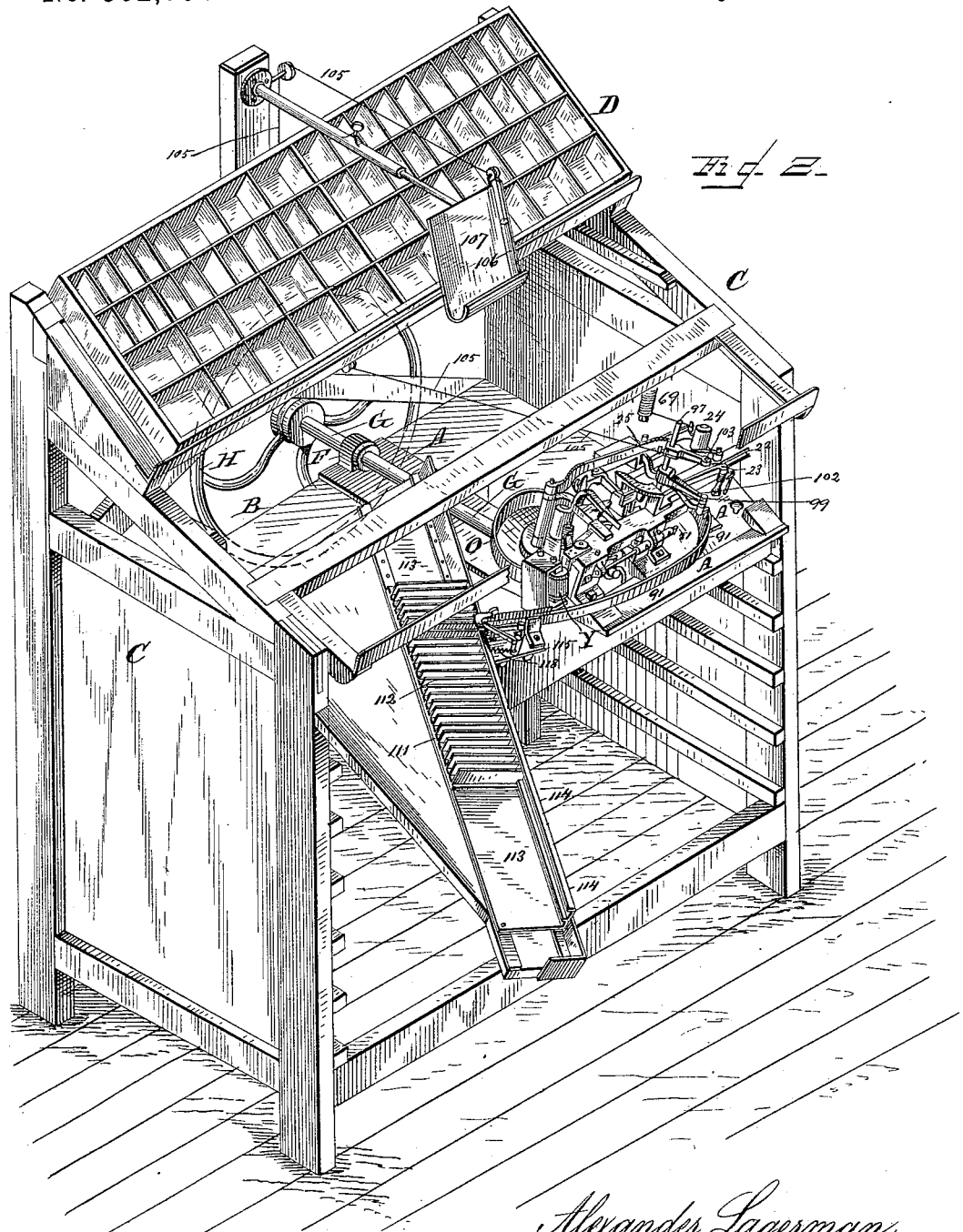

(No Model.) 17 Sheets—Sheet 3.
A. LAGERMAN.
MACHINE FOR SETTING TYPE.
No. 362,751. Patented May 10, 1887.
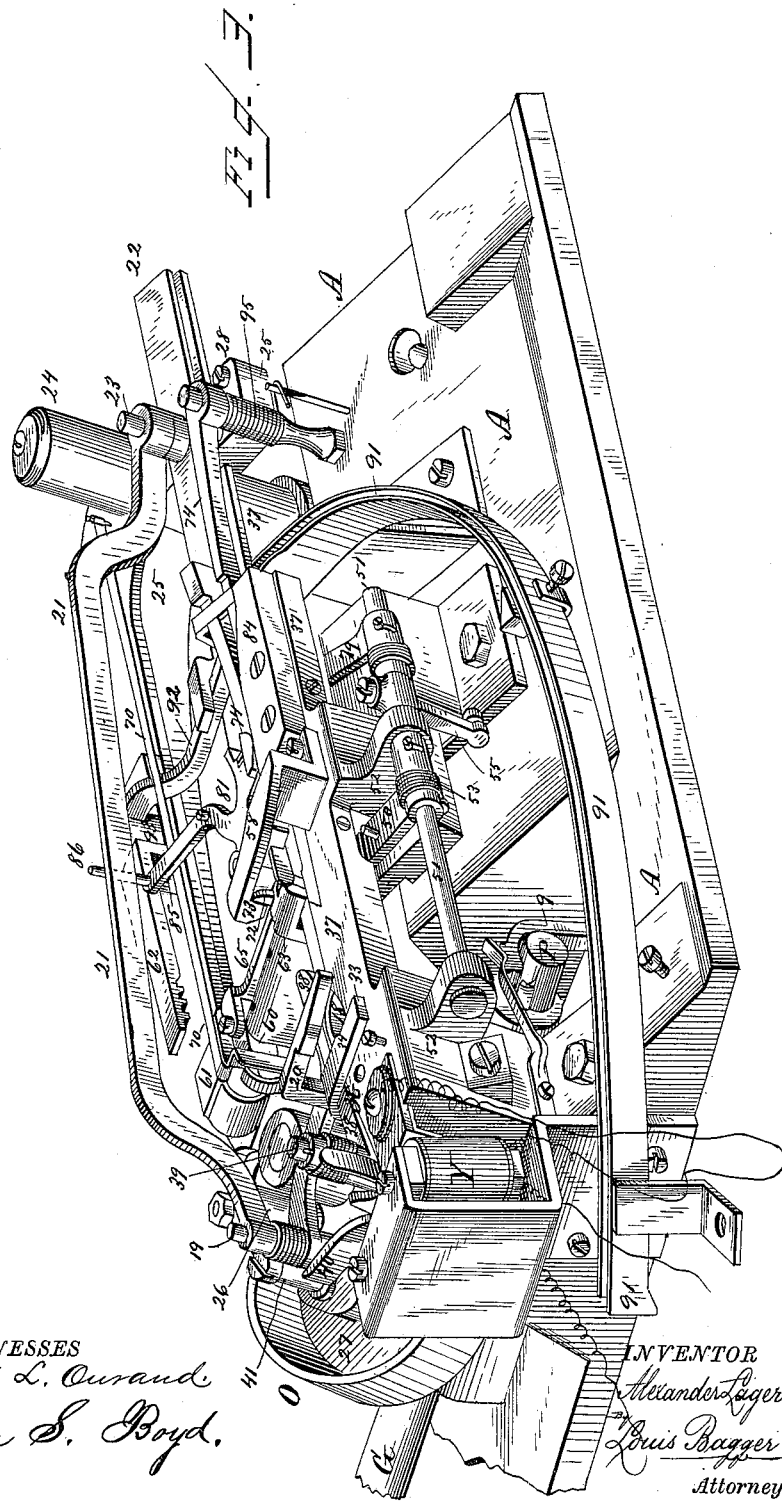
WITNESSES
Franck L. Ourand
William S. Boyd
INVENTOR
Alexander Lagerman
by Louis Bagger & Co
Attorneys.

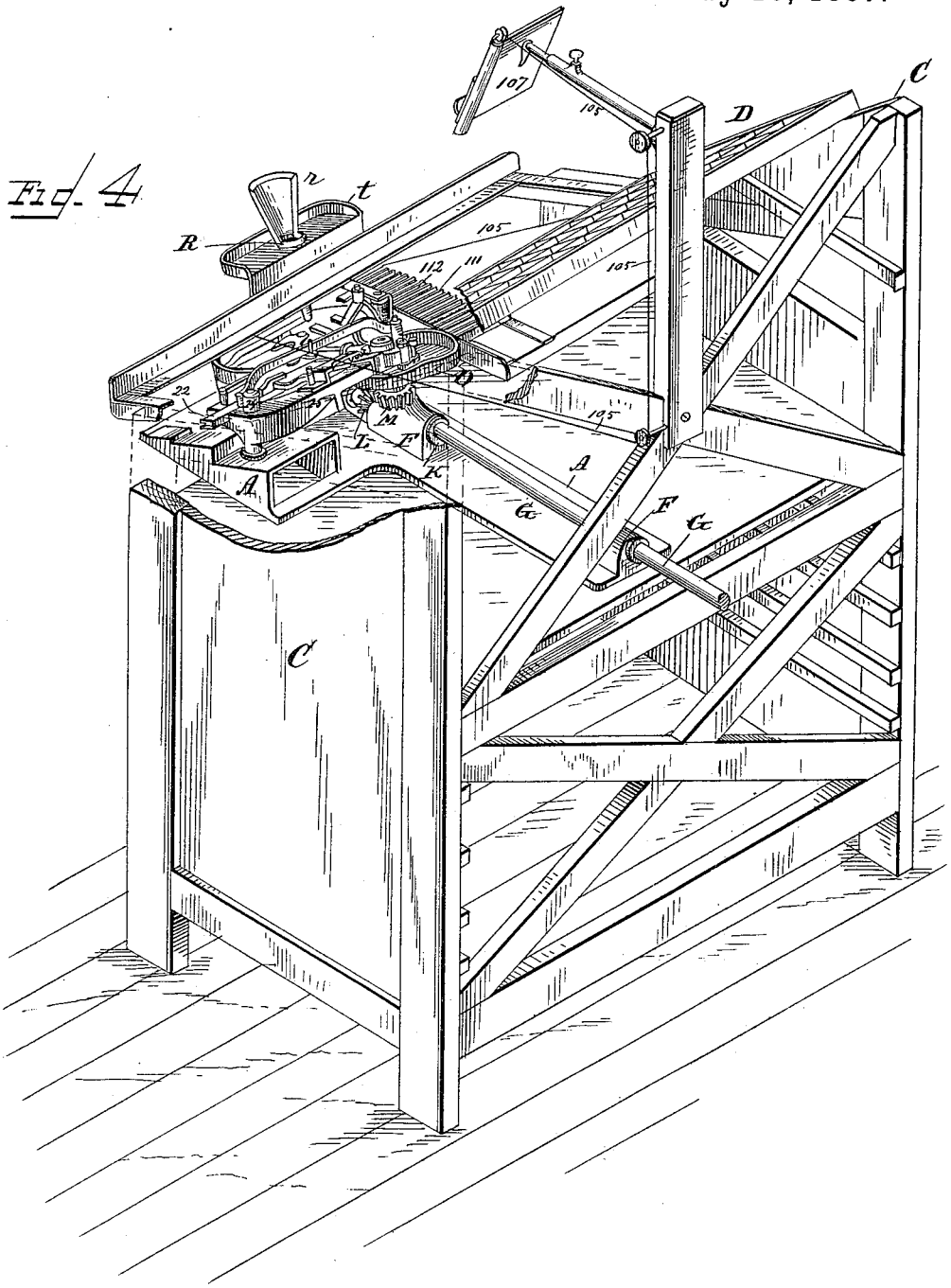

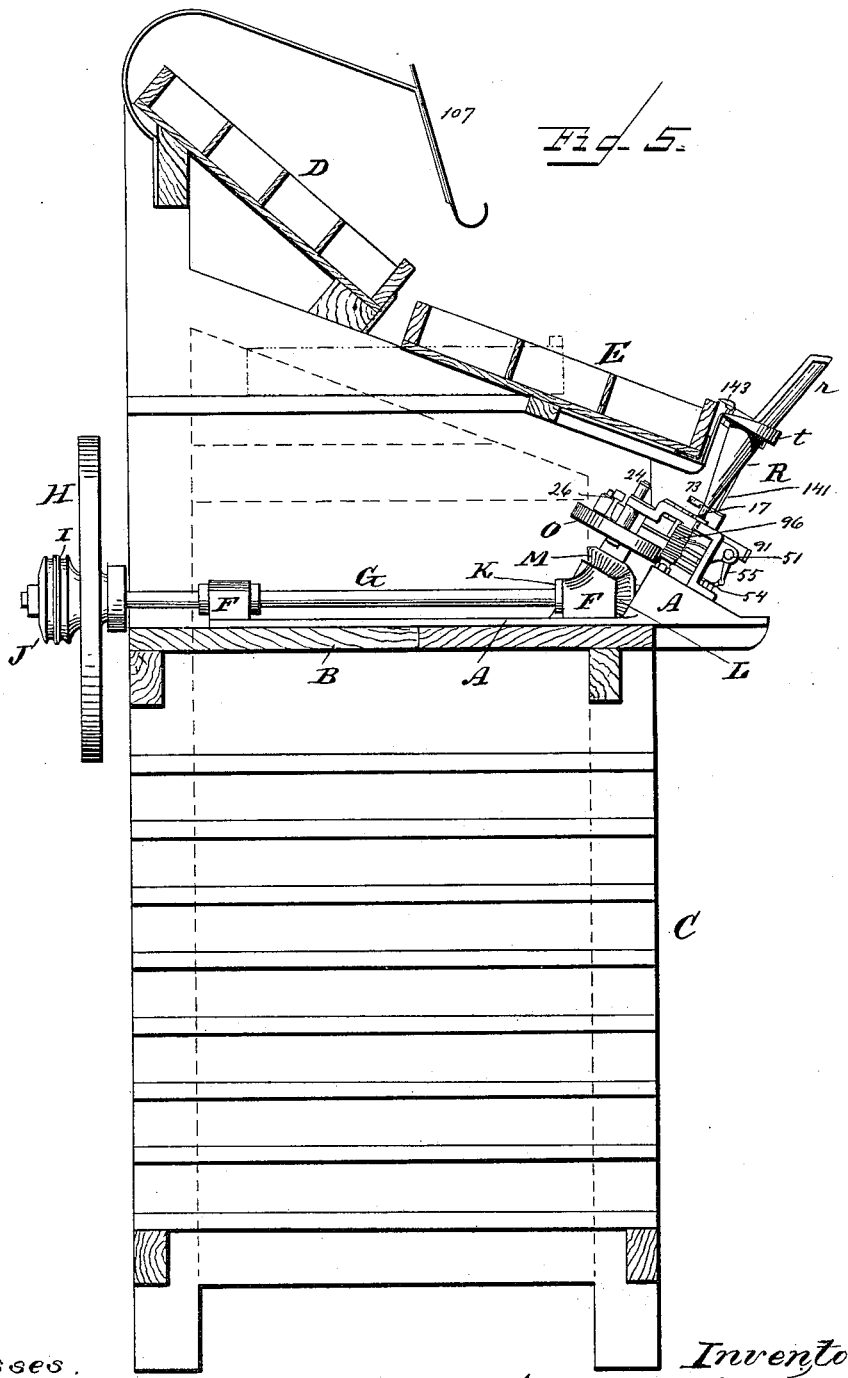

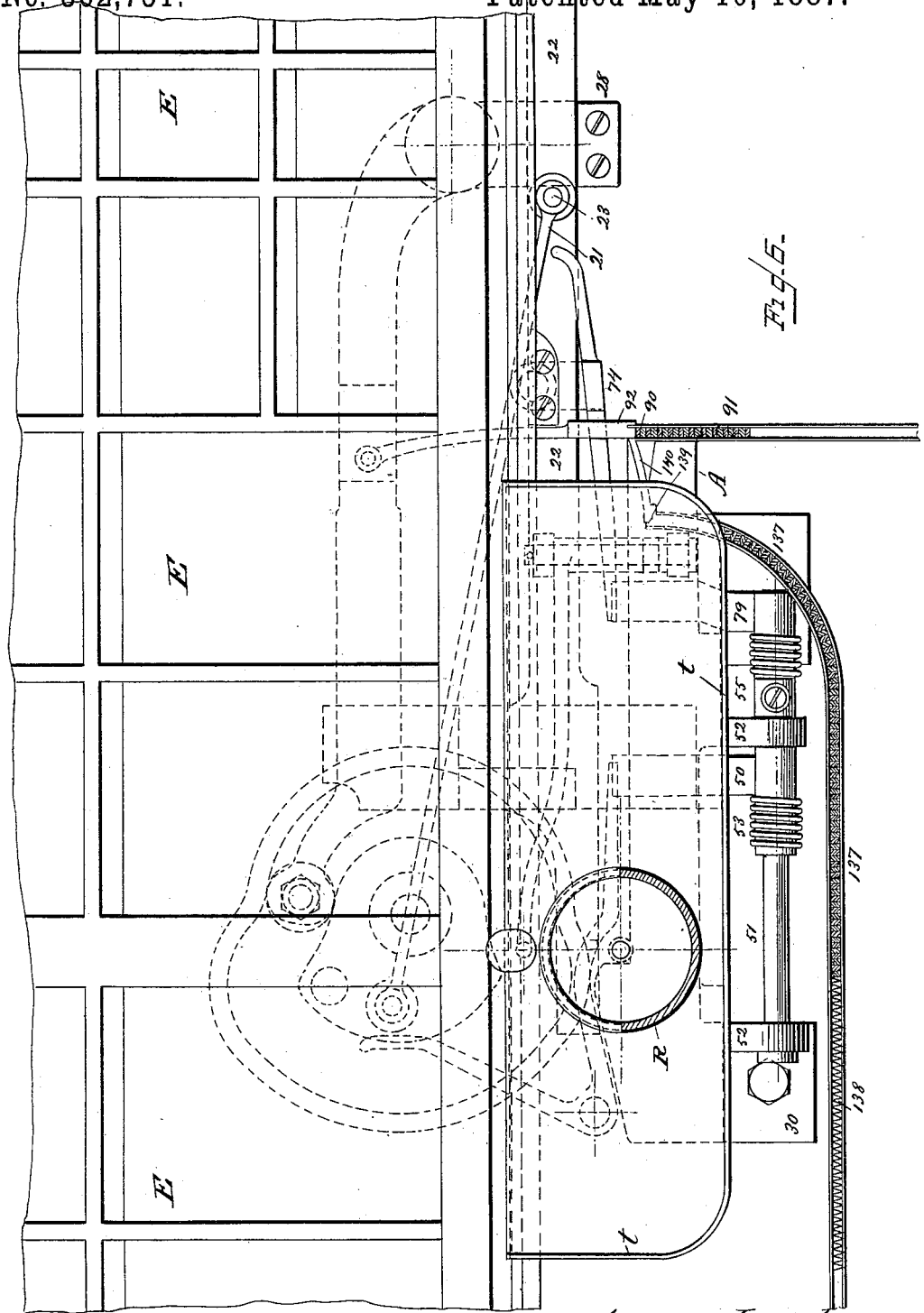

(No Model.)  17 Sheets—Sheet 1.
A. LAGERMAN.
MACHINE FOR SETTING TYPE.
No. 362,751.  Patented May 10, 1887.
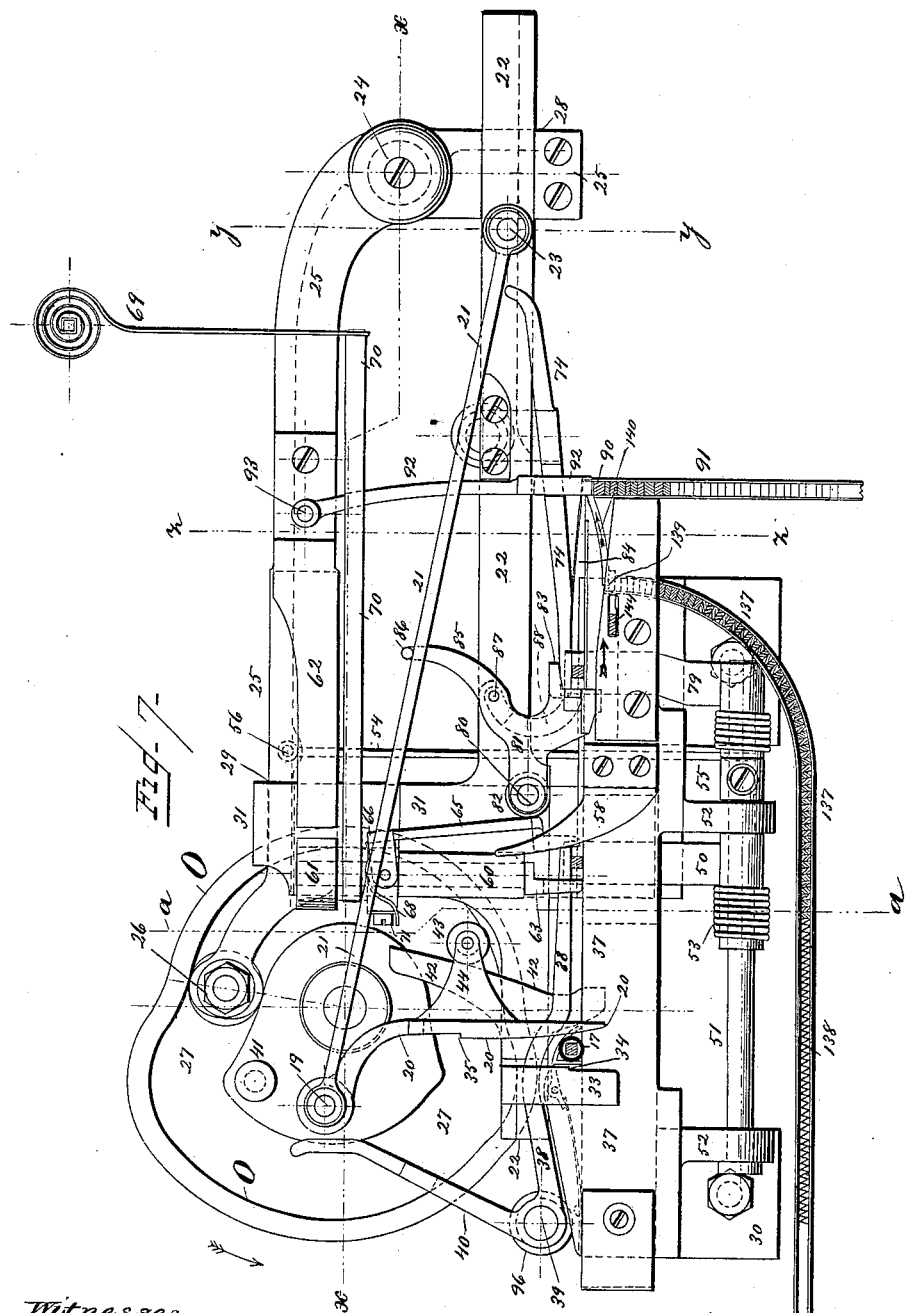
Witnesses:
F. L. Ourand
William S. Boyd,
Inventor:
Alexander Lagerman
By Louis Bagger & Co.
Attorneys.

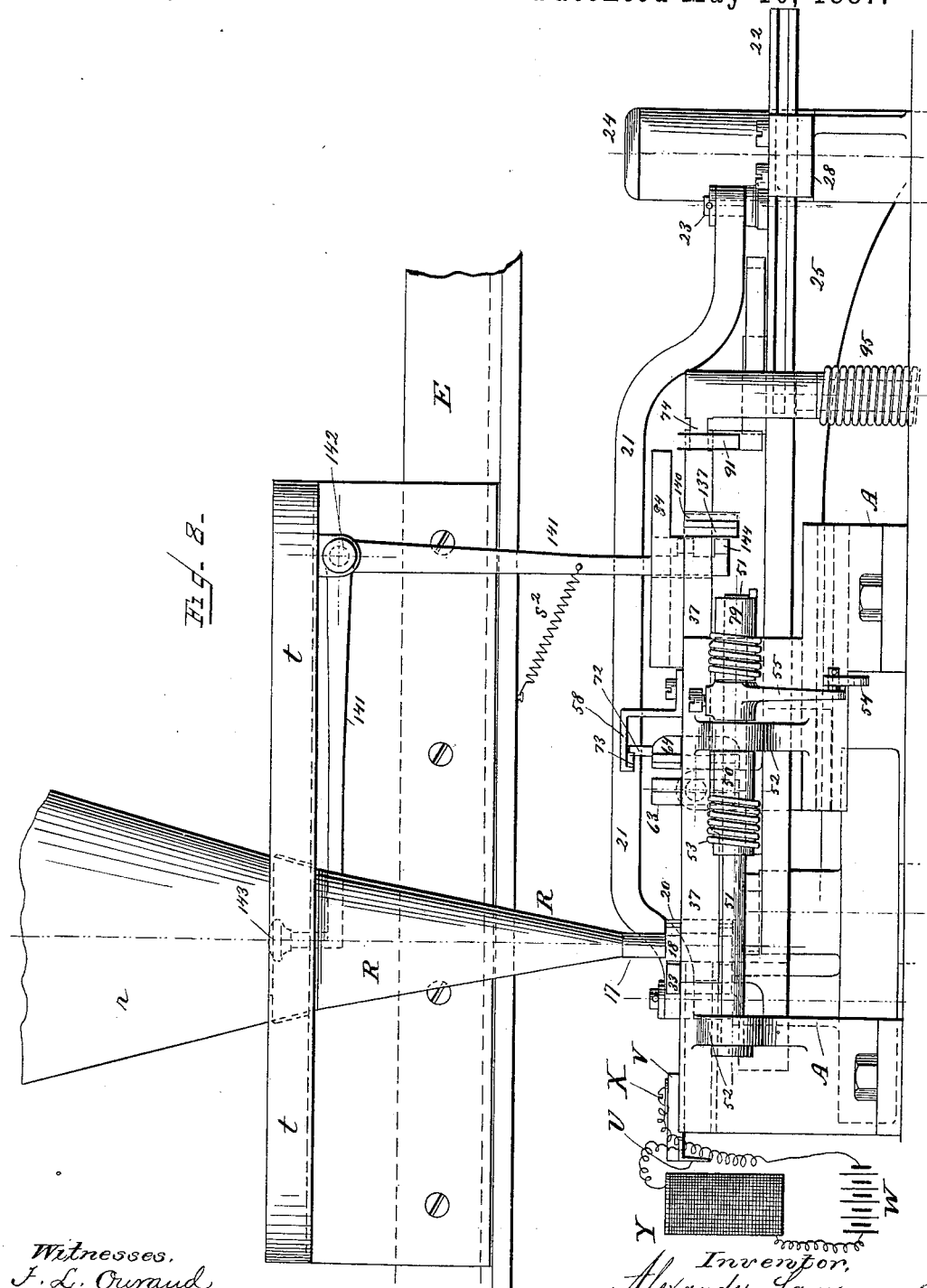

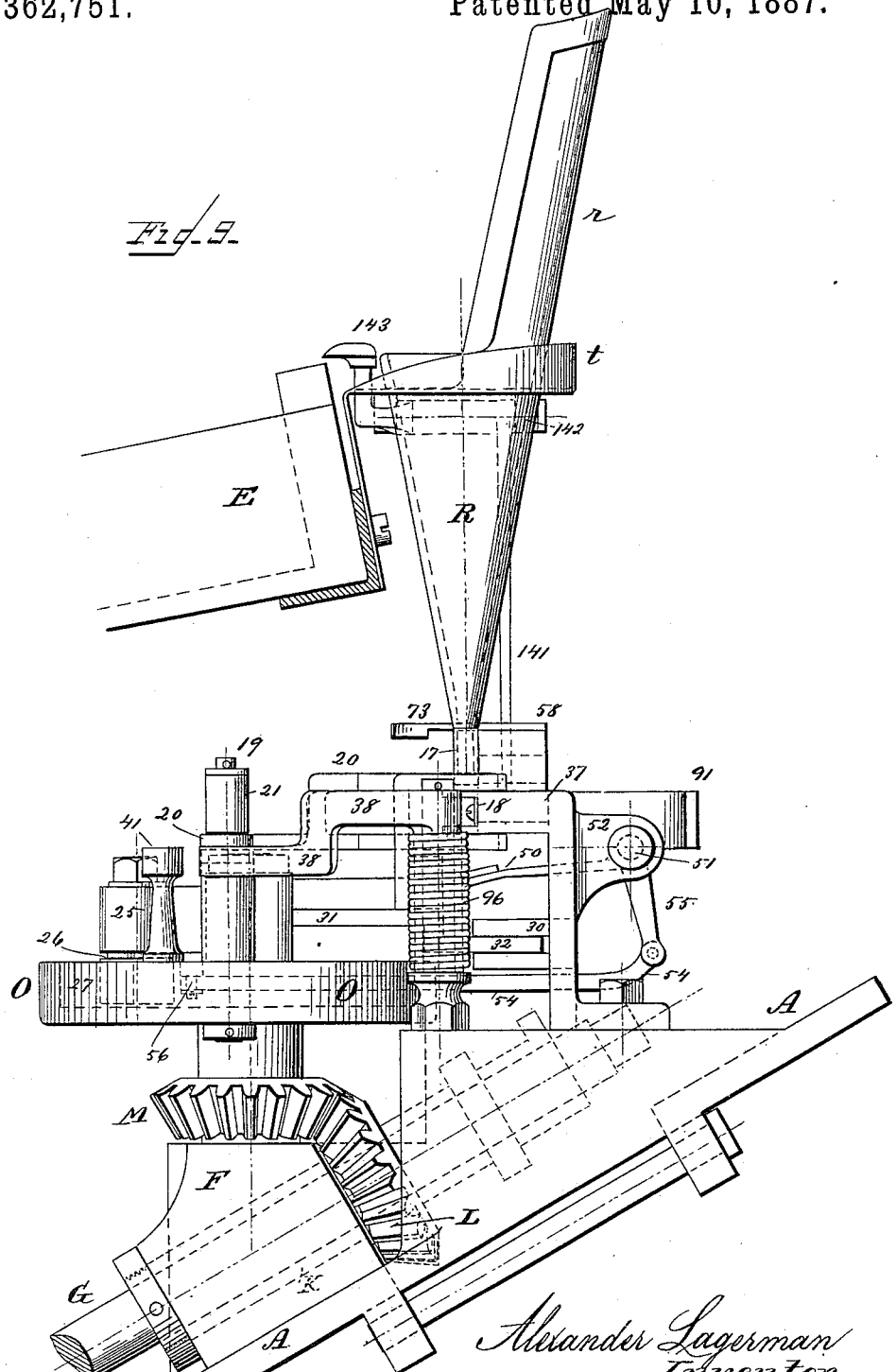

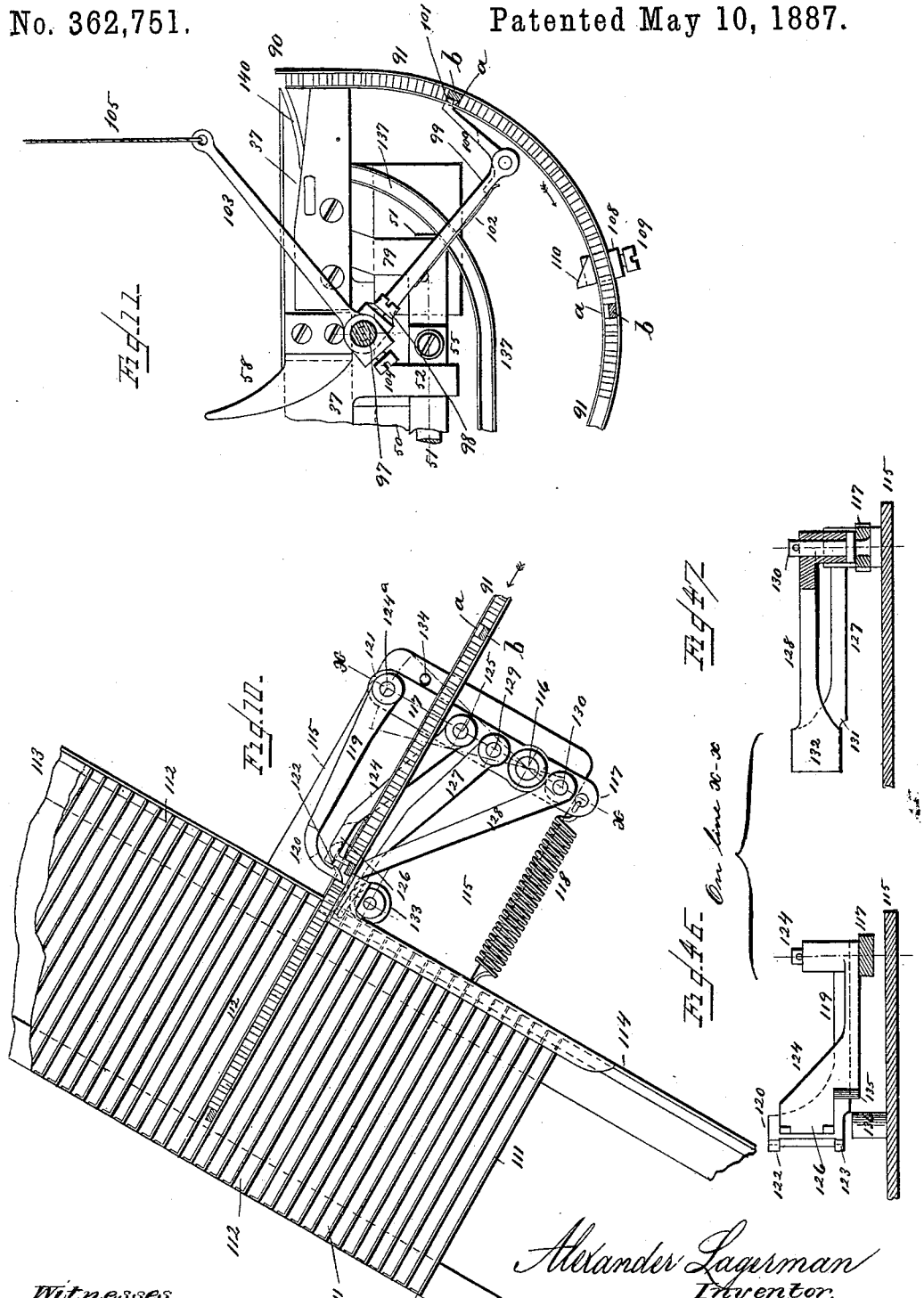

(No Model.)
17 Sheets—Sheet 11.
A. LAGERMAN.
MACHINE FOR SETTING TYPE.
No. 362,751. Patented May 10, 1887.
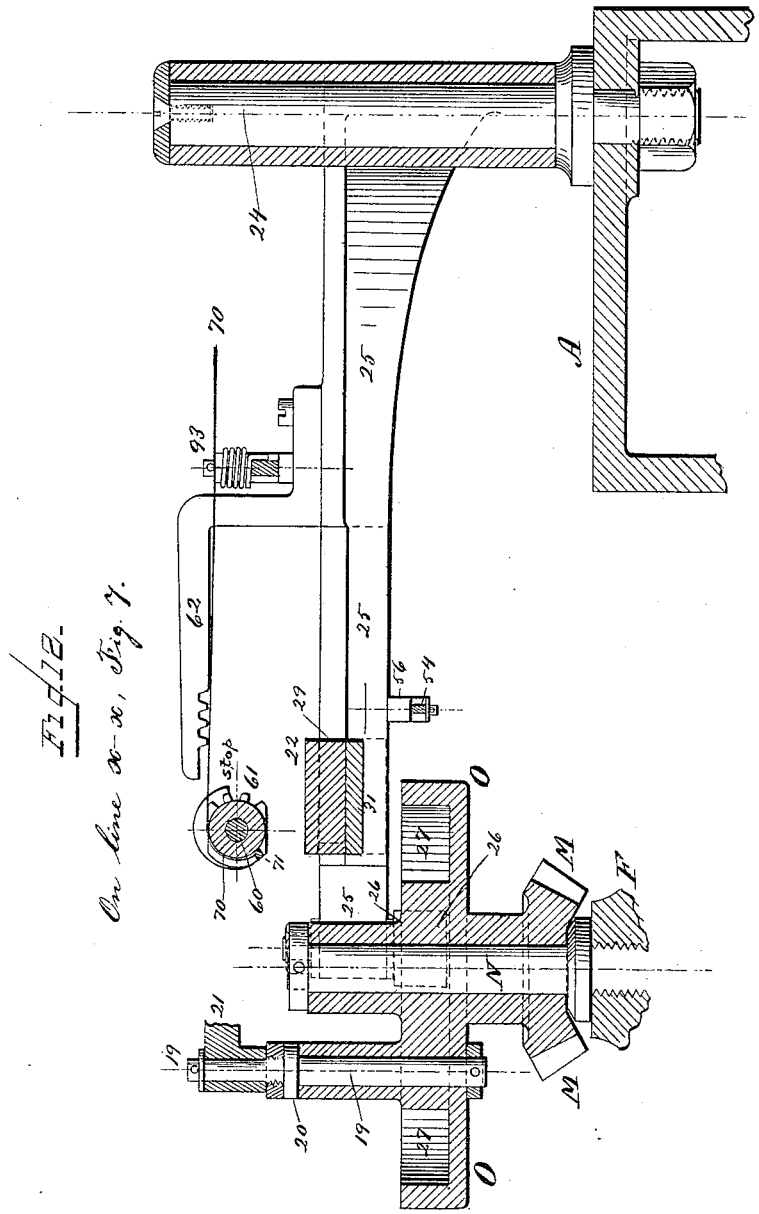
Witnesses.
J. L. Ourand
William S. Boyd,
Inventor.
Alexander Lagerman,
By Louis Bagger & Co,
Attorneys
N. PETERS, Photo-Lithographer, Washington, D. C.

(No Model.) 17 Sheets—Sheet 12.

A. LAGERMAN.
MACHINE FOR SETTING TYPE.

No. 362,751. Patented May 10, 1887.

On line y-y, Fig. 7.

On line z-z, Fig. 7.

On line a-a, Fig. 7.

Witnesses.
F. L. Durand
William S. Boyd

Inventor:
Alexander Lagerman
By Louis Bagger & Co.
Attorneys.

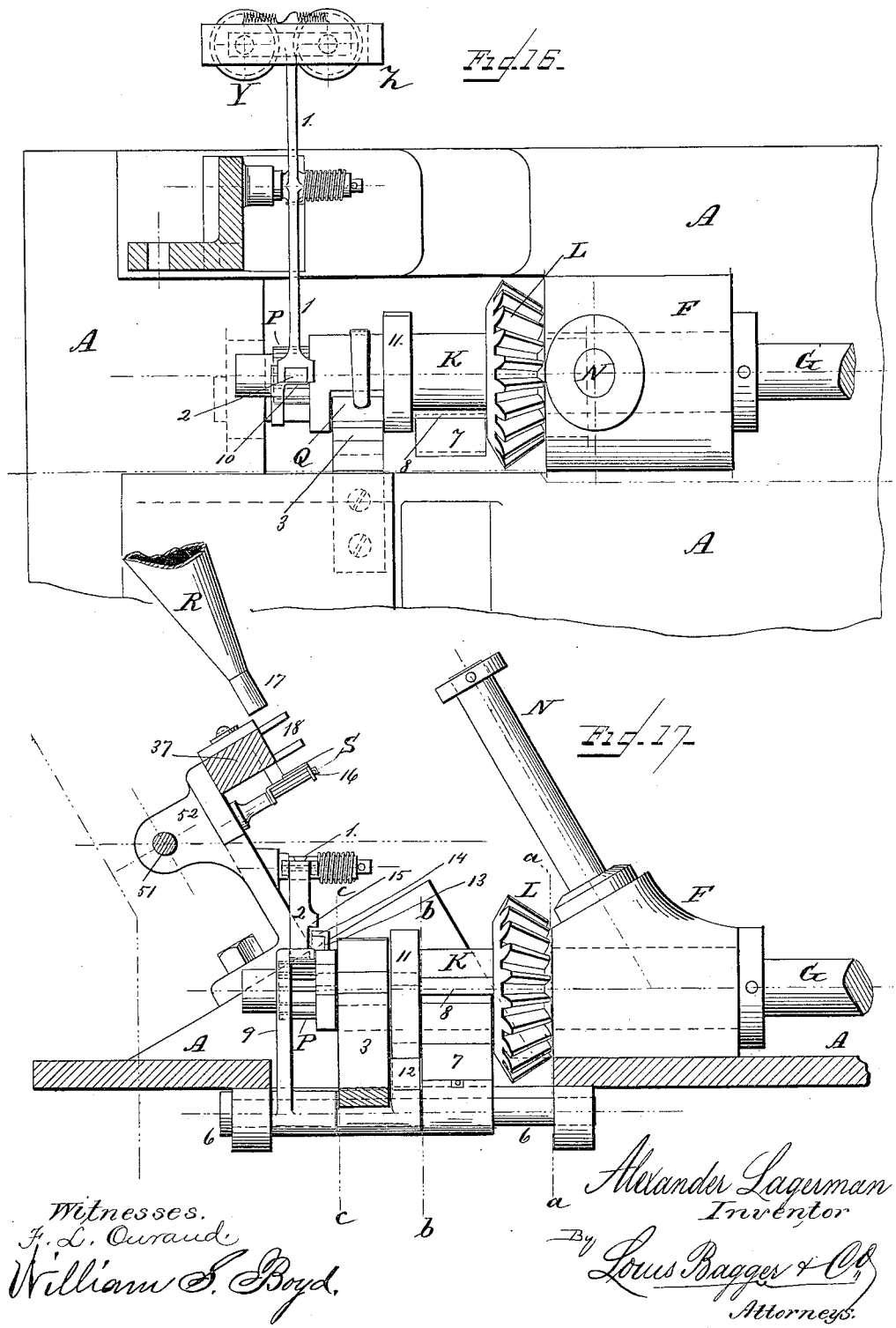

(No Model.) 17 Sheets—Sheet 14.
A. LAGERMAN.
MACHINE FOR SETTING TYPE.
No. 362,751. Patented May 10, 1887.
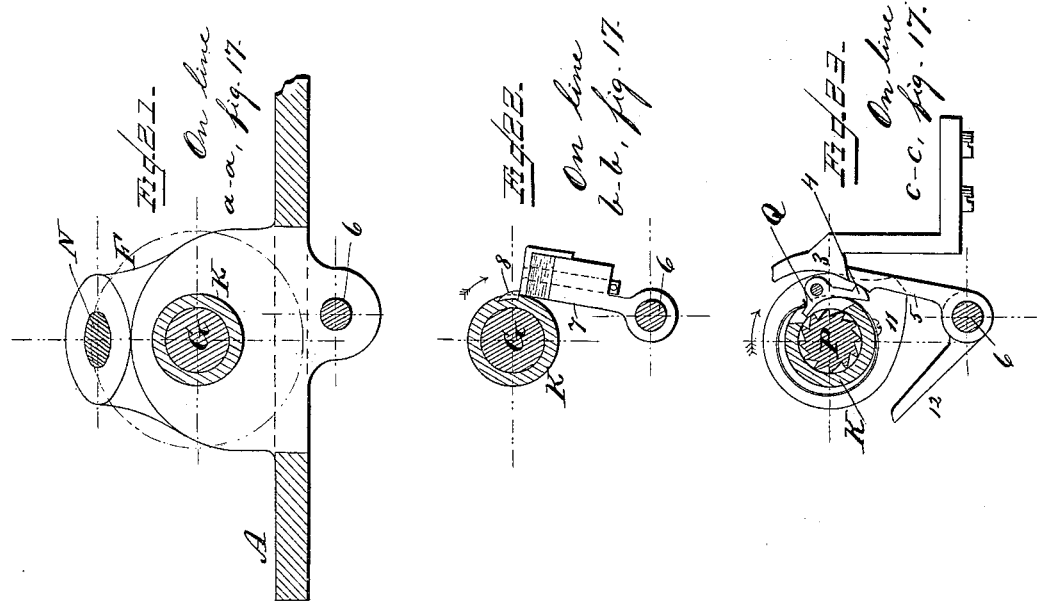
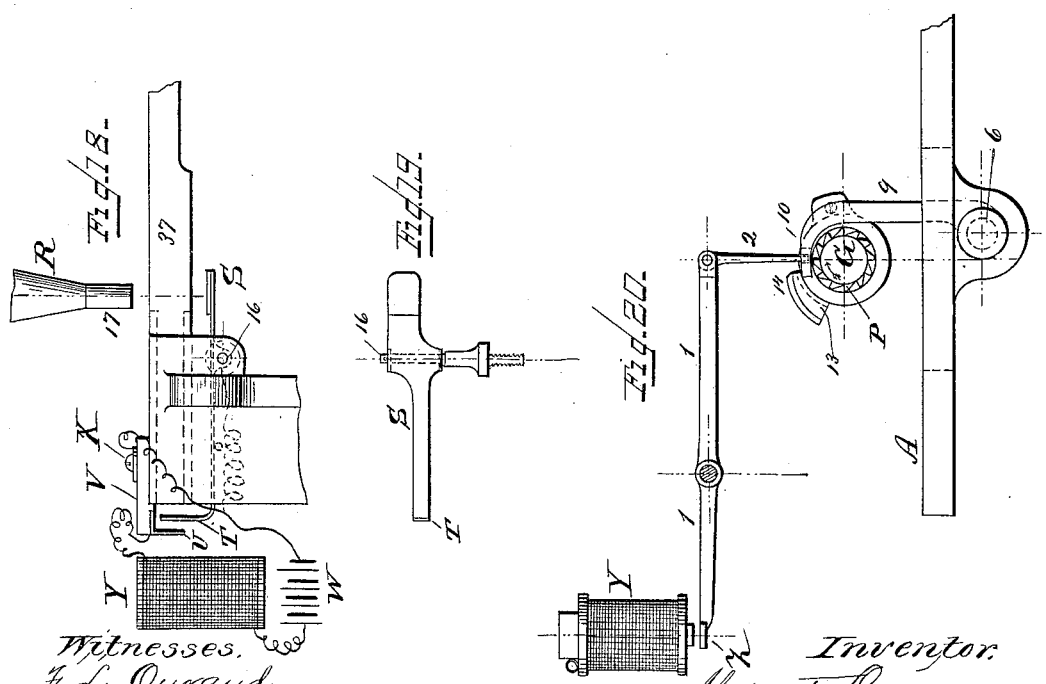
Witnesses.
F. L. Durand.
William S. Boyd.
Inventor.
Alexander Lagerman,
By Louis Bagger & Co.
Attorneys.

(No Model.) 17 Sheets—Sheet 15.
A. LAGERMAN.
MACHINE FOR SETTING TYPE.
No. 362,751. Patented May 10, 1887.
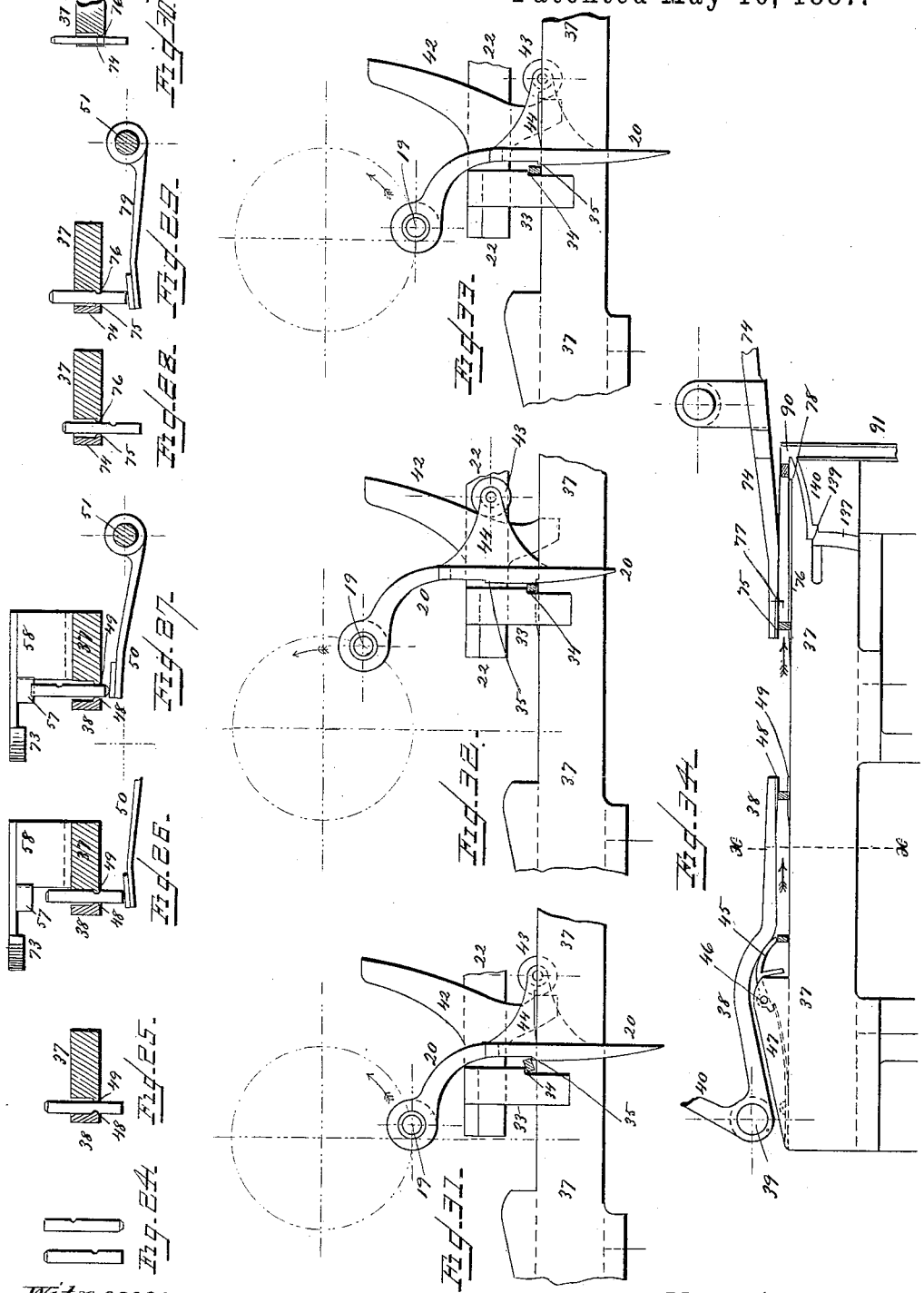
Witnesses.
F. L. Durand
William S. Boyd
Inventor:
Alexander Lagerman
By Louis Bagger & Co
Attorneys.

(No Model.) 17 Sheets—Sheet 16.
A. LAGERMAN.
MACHINE FOR SETTING TYPE.
No. 362,751. Patented May 10, 1887.
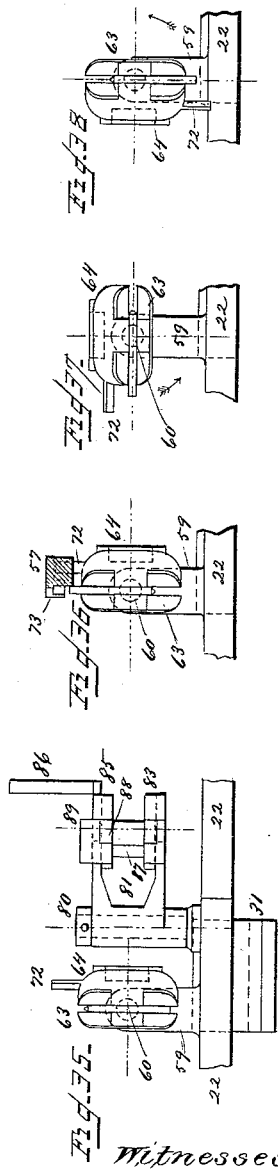
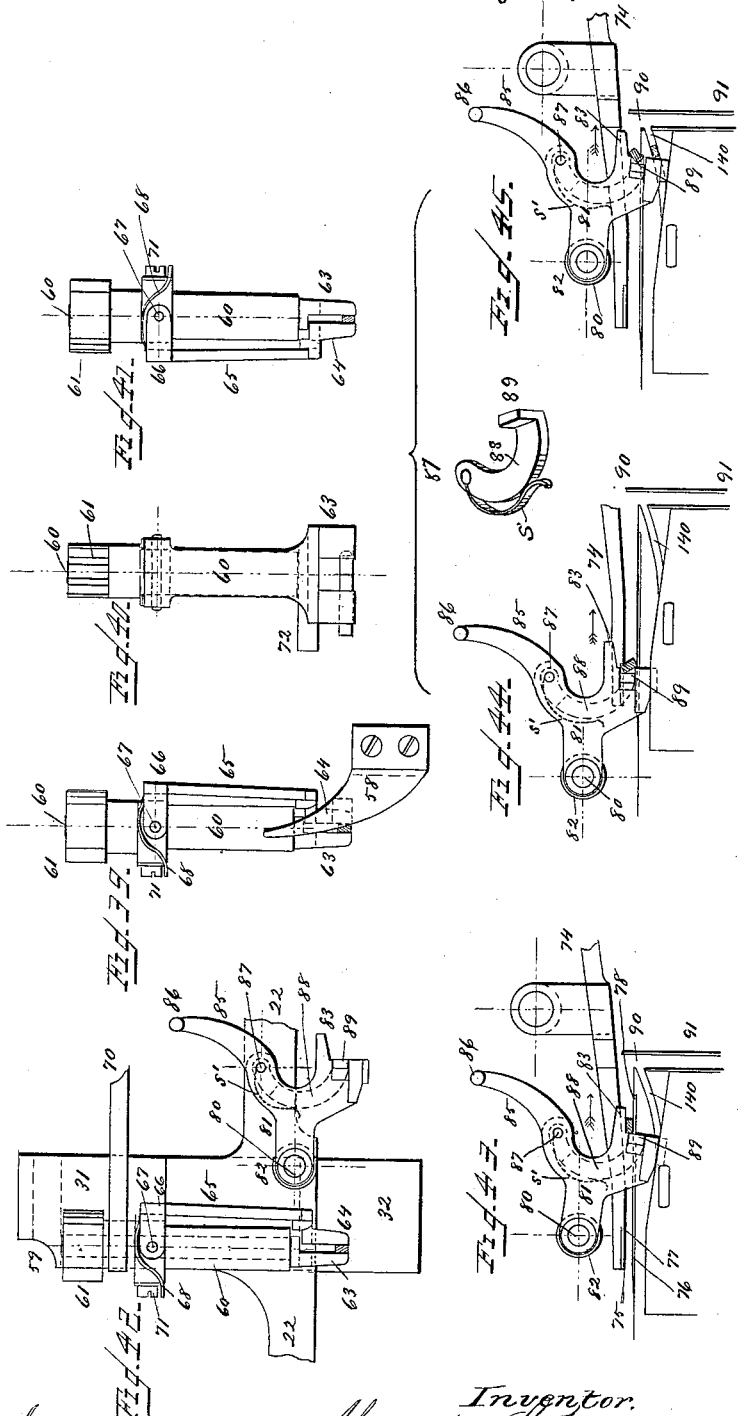
Witnesses.
F. L. Durand.
William S. Boyd.
Inventor.
Alexander Lagerman,
By Louis Bagger & Co.
Attorneys.

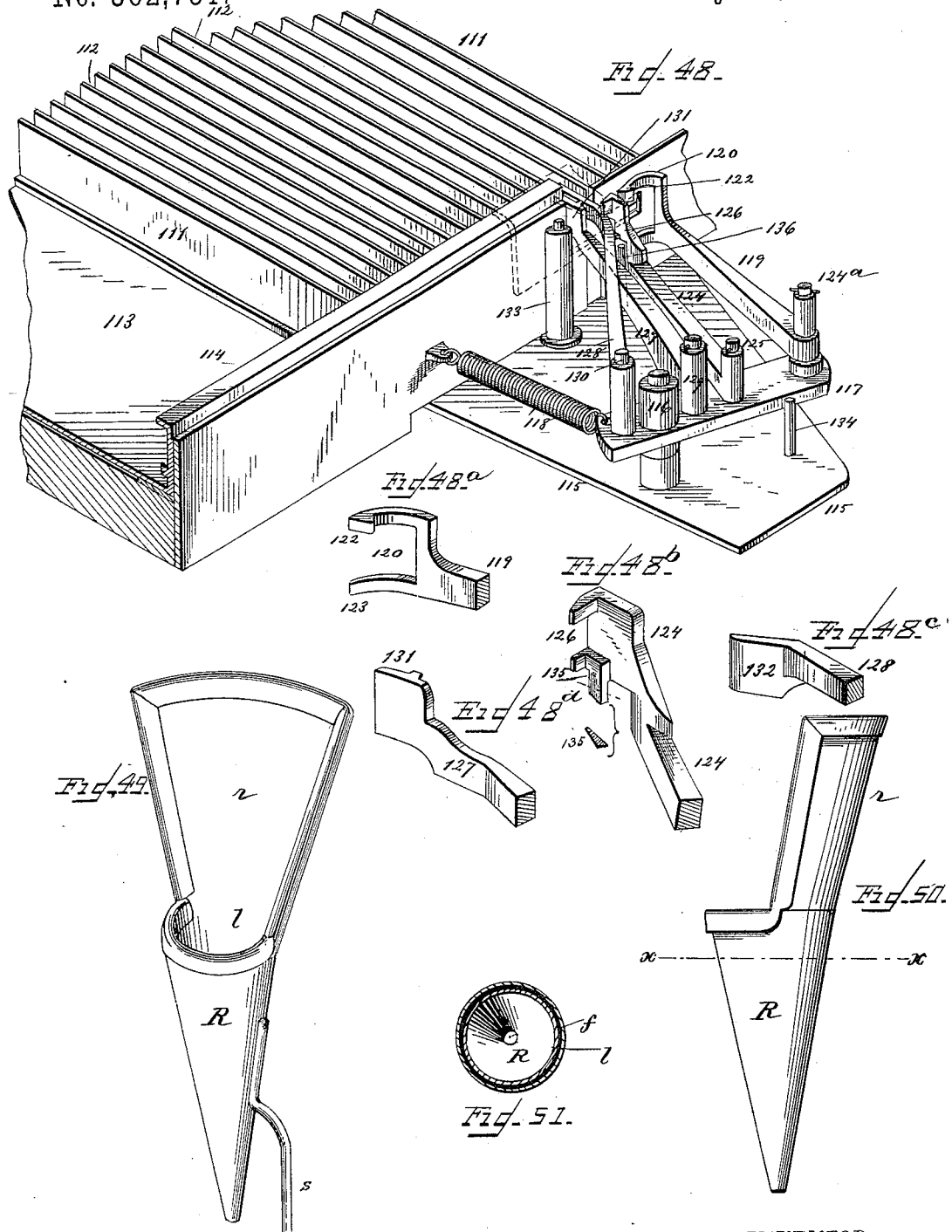

UNITED STATES PATENT OFFICE.

ALEXANDER LAGERMAN, OF JÖNKÖPING, SWEDEN, ASSIGNOR TO THE LAGERMAN TYPOTHETER COMPANY, OF NEW YORK, N. Y.

MACHINE FOR SETTING TYPE.

SPECIFICATION forming part of Letters Patent No. 362,751, dated May 10, 1887.

Application filed August 28, 1886. Serial No. 212,133. (No model.)

*To all whom it may concern:*

Be it known that I, ALEXANDER LAGERMAN, a subject of the King of Sweden, and a resident of Jönköping, in the Kingdom of Sweden, have invented certain new and useful Improvements in Machines for Setting Type; and I do hereby declare that the following is a full, clear, and exact description of the invention, which will enable others skilled in the art to which it appertains to make and use the same, reference being had to the accompanying seventeen sheets of drawings, which form a part of this specification.

This invention has relation to machines for composing or "setting" type, and is adapted to be used in connection with a printer's case of the ordinary and well-known construction and arrangement.

One of the chief objections to the numerous composing-machines heretofore invented has been that these machines involve a radical departure from the old-fashioned way of setting type by manual labor, and for this reason they do not find favor with compositors or printers, who, as a rule, do not care to depart materially from the method of setting type to which they have been for years accustomed; again, all of the so-called "type-composing machines" with which I am acquainted are cumbersome, complicated, and therefore necessarily expensive, and are not within the reach of printers of ordinary means.

The object of my invention is to produce a small, inexpensive, and compact machine, which is used in combination with the ordinary "case," forming, preferably, a part thereof or attachment thereto, and by the use of which the compositor is enabled to use both his right and left hand in picking up the types from the case, instead of using the right hand only for that purpose while he holds the composing-stick in the left hand, as now practiced in setting type by hand; and if, by any accident, the machine should break down or become inoperative, the compositor need not stop his work for that reason, but can immediately and without leaving the case resort to the old-fashioned way and use the "stick," the same as before he commenced to use the machine at all.

Before going into the details of the construction of my machine I shall first give a general outline of its operation and general features, from which it will be seen that the operator or compositor can use both hands indiscriminately and as rapidly as may be, as all he has to do is to pick up the type from the two trays or cases on the frame or stand in front of him, and throw the type as fast as he picks it up into a funnel-shaped hopper within convenient reach, and without regard to how the nicks are situated or which way the face of the type is turned, either up or down, thereby not only utilizing the left hand in picking up type as well as the right, but avoiding the loss of time incident to the operation of placing the body of the type in its right position in the stick. On the composing-frame, close under the "lower case," is arranged a mechanism which derives its motion from some motive power by means of a belt-pulley or other suitable gearing. At the front edge of the case, where the compositor stands, is a funnel-shaped hopper or receptacle, which has an opening at its lower end just wide enough to allow a single type to slide lengthwise through the same. Below this opening is located a finely-balanced lever, which, as the type strikes it, closes an electric circuit in such a manner as to operate an electro-magnet, the armature of which starts the mechanism, which is actuated by the motor in such a manner that the driving-gear of said mechanism will make a single revolution and then again come to a stop. During this revolution of the gear the type is caught between a pair of arms, which carry it to one side, so as make room under the hopper for the type next in order, and at the same time bring the type grasped by them into a certain position between the fixed frame of the machine and a spring-actuated lever. If, while the type is in this position, the nick happens to be turned upward, which means that the type is turned upside down, then the operation of the machine will be to push the body of the type upward in its longitudinal direction by means of a lever worked from underneath; but if, on the other hand, the nick happens to be turned downward, which means that the type is right side up, then the nick in this right position will be engaged by a catch, which will prevent the type from being pushed upward by the mechanism which would otherwise act upon it. This operation being performed, the machine comes to a stop until the type next following (which will be the second in numerical order) has been dropped through the hopper and reached the lever at the lower end of the same, which again sets the mechanism in motion. At this stage of the performance of the machine a pair of pinchers revolving upon a small horizontal shaft will grasp the first type, which I will call "number one," carrying the same forward while holding it sidewise. Now, if the position of the nick in this type has been such as to allow the type to be pushed upward during the previous step in the operation of the machine, or, in other words, if the type has been turned face downward, then the upwardly-extending part of the type-body is made to strike against a projecting bar, whereby the pinchers holding the type are twisted slightly out of their vertical position, simultaneously with which a gear on the other end of the shaft, which carries the pinchers, is caused to engage a fixed rack, by which, during the remainder of the motion of the machine, this pinchers-carrying shaft will complete a one-half revolution, thus reversing the type which is held by the pinchers and turning it right side up; but before letting go of the type these pinchers are caused to deposit it between the frame of the machine and a spring-actuated lever, which operates in the same manner as the one hereinbefore referred to. On the other hand, if the position of the nick in the type has been such as not to allow the type to be pushed upward during the second step in the operation of the machine—that is to say, if the type stands face upward—then the body of the type will not be pushed upward, and consequently there will be no extending end to strike the projecting bar hereinbefore referred to. The pinchers which hold the type will therefore not revolve, and the position of the type will not be reversed; but in this case it will simply be deposited as soon as it is released in its original position between the frame of the machine and the spring-actuated lever. At this stage of the operation of the machine we shall find the type number one, with which we started, always with face upward and with its greatest width in a certain direction; but the nick may be turned either right or left. The step next in order will be, therefore, to so adjust the type that the nick shall be in its proper position, which involves a third operation, or, rather, a third step in the operation of the machine, and this commences as soon as the motive mechanism is for the third time set in motion by the dropping of type number three through the receiving-funnel. The spring-actuated lever, by which type number one is supported on one side, as also the fixed sill or frame, which supports the type on the other side, are both provided with longitudinal ribs or feathers on their inner sides, or the sides facing each other, which register with the nicks in the type, and as the type is being pressed up sidewise against this ribbed bed or support, at the same time being pushed forward in the channel formed between said ribbed lever and frame, it follows that either one or the other of these ribs or feathers will engage the nick. As the type slides along in this position it is caused to strike a low projection on the side toward which the nick is turned, and this causes the type to trip over on its flat side, in which position the spring-actuated lever will close in upon it, the pusher meanwhile continuing to carry the type onward in its channel until it reaches the end of the same, where the type, now in its right position in all respects, is deposited in the type-gutter, which conducts it to the composing-galley. This finishes the third step in the series of consecutive operations of the machine. As the type fourth in order is dropped into the hopper by the compositor standing in front of his case, type number two will reach this third stage or step, and type number three will, simultaneously therewith, reach the second step, while type number one is by this time deposited in the type-gutter which leads to the galley. Thus it will be seen that each of the broken or intermittent motions of the machine induces three simultaneous operations, each one of which forms a certain step in the complete process of the preliminary setting of the type. As type after type is pushed into the type-gutter, a long line of continuous type is gradually assembled or built up, which can be divided up into lines of any desired length simply by the compositor making use of a special type, which I call a "break," and throwing the same into the funnel the same as the regular types. By using this break at regular intervals, lines of approximately even length are produced. In order to enable the compositor to determine when he is to use a break, I have devised a simple device which operates in conjunction with the other parts of the machine, and which will be fully described at the proper place. At the end of the type-gutter is a galley, or, more properly speaking, a composing-stick of large dimensions, provided with transverse parallel gutters or channels, in which the lines of type are received as fast as they are formed in the type-gutter. At the end of each line this galley is moved automatically a distance equal to the width of one of the type-receiving gutters or channels, and in this manner the composed matter is assembled into distinct lines of any length that may be desired.

Having in the foregoing given a brief sketch or outline of the salient features of the machine, so far as its operation or manner of working is concerned, I shall now proceed to give a detailed description of the mechanical construction of the same, referring in this connection to the accompanying seventeen sheets of drawings, which form a part of this specification.

Figure 14:
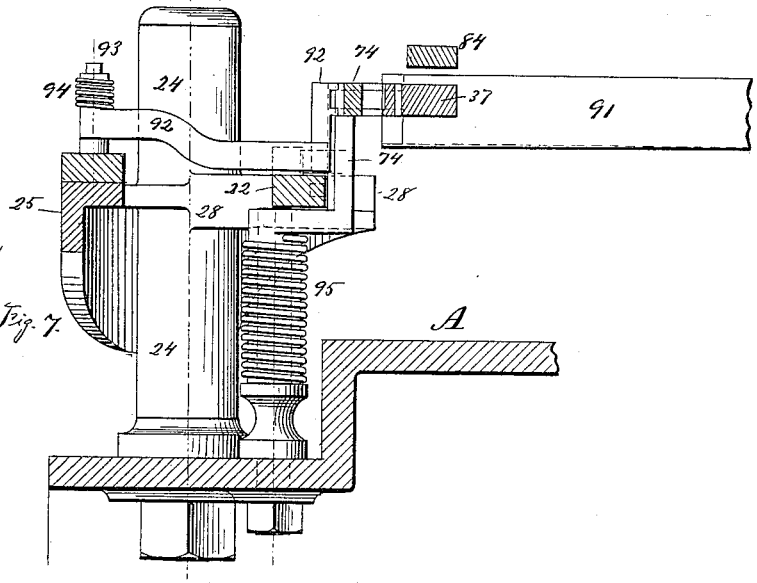
Figure 15:
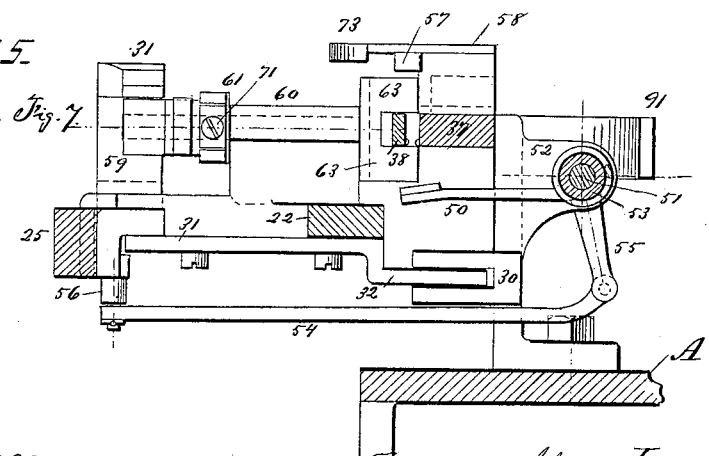

On the said drawings, Figure 1 is a perspective view of the printer's case provided with this machine as it appears when ready for work. Fig. 2 is a similar view, but the casings of the machine and also the lower case on the composing-frame have been removed, for the purpose of showing the construction and arrangement of the machine more fully. Fig. 3 is an enlarged perspective view of the main part of the machine removed from the composing-case. Fig. 4 is a perspective view of the frame and machine from a point of view diametrically opposite to the point from which the view shown in Fig. 2 is taken. Fig. 5 is a vertical transverse sectional view of the frame and cases, or type-trays, looking from left to right, and showing the machine with its drive-shaft in operative position. Fig. 6 is a plan or top view of the machine and a portion of the lower case adjacent thereto, the parts of the machine covered by the lower case being shown in broken lines. Fig. 7 is a plan of the machine detached from the printer's case. Fig. 8 is a front elevation of the machine, showing also part of the front side of the lower case. Fig. 9 is a view, parts being shown in elevation and parts in section, of the machine as seen from one side—viz., by a person standing to the left of the frame and looking toward it, (parts of the frame having been removed to show parts of the drive-shaft and gears,) the position occupied by the parts in this figure varying from the position of the same parts as shown in Fig. 5 by an angle of about thirty degrees. Fig. 10 is a detail view of the mechanism which feeds the continuous line of type from the type-gutter to the galley, showing also the breaks whereby the length of the lines is determined. Fig. 11 is a detail view of part of the device or mechanism whereby the compositor is advised of the proper time when he is to drop a break into the funnel for the purpose of closing up a line. Fig. 12 is a longitudinal vertical sectional view taken on the broken line marked $x\ x$ in Fig. 7. Fig. 13 represents a vertical cross-section through the broken line denoted by the letters $y\ y$ in Fig. 7. Fig. 14 represents a vertical cross-section on the broken line denoted by $z\ z$ in Fig. 7, looking from left to right. Fig. 15 is a detail view, partly in section, illustrating the device for lifting or pushing the type upward to enable it to be grasped by the revolving pinchers. Fig. 16 is a plan of the mechanism whereby an intermittent motion is imparted to the machine from the continuously-revolving drive-shaft. Fig. 17 is a side elevation, partly in section, of the same mechanism. Fig. 18 is a detail view of the tripping-lever actuated by the type as it drops through the lower end of the funnel, which brings the electro-magnet into action, and thereby sets the machine going. Fig. 19 is a top view of said lever. Fig. 20 is a detail view of the electro-magnet, with its armature and lever, showing the pawl-and-ratchet mechanism whereby an intermittent motion is imparted to the machine from the continuously-revolving drive-shaft. Fig. 21 is a detail view of the box or bearing which carries one end of the continuously-revolving drive-shaft. Fig. 22 is a detail view of the stop mechanism which engages the drive-collar when it is desired to stop the machine. Fig. 23 is a detail view of part of the mechanism whereby an intermittent motion is imparted to the machine from the continuously-revolving drive-shaft. Fig. 24 represents two types, the one to the left being turned right side up or face upward, while the one to the right is turned wrong side up with face downward. Fig. 25 is a detail view illustrating the manner in which the nick in the type is caught or engaged by the rib or feather of the spring-actuated lever, (section on line $x\ x$, Fig. 34.) Fig. 26 shows the type in a reversed position, with its nick engaged by the rib or feather which projects from the fixed bed of the machine. This figure, as well as Fig. 27 on the same sheet, also shows the "pusher," which shoves or pushes the type in an upward direction from the under side. Fig. 27 is a detail view showing the type pushed up by the pusher, so as to strike against the stop or projection which brings the revolving pinchers into action. Figs. 28, 29, and 30 show a type in its various positions while held between the spring-actuated lever and the fixed frame of the machine. Fig. 31 is a detail plan view of the mechanism which first receives the type on its travels from the trap or lever at the lower end of the hopper, and whereby the type is turned sidewise as the first step in the series of operations which it is to undergo, said figure showing the position of the movable jaw at the initial point or starting-point. Figs. 32 and 33 are similar views of the same mechanism, showing the jaw in its different positions, the last-named figure showing the jaw in its proper position at the terminal point of its operation after the hub to which the jaw is pivoted has completed its circular track, as indicated by the arrows. Fig. 34 is a detail plan view of the spring-actuated lever and fixed frame between which the type is held while its nick is engaged by the projecting rib or feather on either the lever or the fixed frame, as shown in Figs. 25 to 30, hereinbefore referred to. Figs. 35 to 38 are detail end views of the revolving pinchers, showing the same in their various positions while making the half-turn. Figs. 39 to 41 are top or plan views of this pincher mechanism, in which the jaws and their actuating mechanism are shown in positions corresponding to the positions shown in end elevation in Figs. 36, 37, and 38, respectively. Fig. 42 is a plan view of the shoe or carrier and its adjuncts, whereby the type is placed in proper position for entering the type-gutter which carries it to the composing-galley. Figs. 43 to 45 are similar views of the same devices, but showing them in their different operative positions. Fig. 46 on Sheet 10 is a detail view, in side elevation, of the pair of jaws shown uppermost in Fig. 10 on the same sheet. Fig. 47 is a similar view of the other pair of jaws, shown lowermost in Fig. 10. Fig. 48 is a perspective detail view of the mechanism for feeding the column of set or composed type into the composing-galley and breaking the continuous row or column off into separate lines of proper length. Figs. 48ª, 48ᵇ, 48ᶜ, and 48ᵈ are details of the pivoted arms or dogs forming part of the said mechanism. Fig. 49 is a perspective view of the funnel or hopper. Fig. 50 is a side elevation of the same, and Fig. 51 is a cross-section on line x x in Fig. 50.

Like letters of reference and numerals denote corresponding parts in the several figures.

The main parts of the machine are mounted upon a bed-plate of iron or other suitable metal, (shown at A,) which is suitably fastened upon a horizontal partition, B, in the composing stand or frame, (shown at C.)

The letter D denotes the "upper case," and E the "lower case," the latter overlapping the greater part of the machine, and serving as a partial cover or protection for the same. This bed-plate A is provided with boxes F, Fig. 5, in which revolves the main drive-shaft G, the rear end of which has a fly-wheel or balance-wheel, H, and is also provided with one fixed pulley, I, and one loose pulley, J.

The drive-shaft G passes with its forward end through a loose sleeve or collar, K, which has a cone-pinion, L, meshing with another cone-pinion, M, which revolves upon a tap, N, projecting from the forward box, F, on the bed-plate or frame of the machine, Figs. 5, 9, 12, 16, and 17. This cone-pinion M is cast in one piece with or suitably fastened to a grooved cam, O, and it follows that this cam will revolve with pinion M. It is from this cam that most of the movable parts of the machine derive their motion, and an intermittent motion may be imparted to the said cam O, with its pinion M and the intermeshing pinion L, which, as we have seen, is fixed upon the sleeve K, by the following mechanism: The forward end of that part of drive-shaft G which is inserted through the sleeve K is provided with a ratchet, P, adapted to engage a spring-actuated pawl, Q, which is attached movably to sleeve K, Fig. 23, and revolves with it, and it follows that when the said pawl engages the teeth of the ratchet, sleeve K will revolve with its central shaft, G, which is kept rotating continuously and at an even speed by any suitable motive power.

As a type is dropped through the hopper or funnel R it strikes the rear end of a delicately-balanced lever, S, Figs. 18 and 19, the tripping of which closes an electric circuit by bringing the bent tail T of said lever in contact with a metallic plate, U, which is fastened upon a piece of vulcanite or other suitable insulating material, V. When this lever is in its normal position, as indicated in Fig. 18, the current from the electric generator W is broken; but the moment, by the tripping of the lever, the tail T comes in contact with the insulated plate U, the circuit will be closed, the current passing from the generator W to the metallic screw X, by which the insulating plate or piece V is fastened upon the machine, through the machine, lever S T, contact-plate U, the electro-magnet Y, and back to the generator. It follows that at the instant the circuit is closed the armature Z, Fig. 20, will be attracted by the magnet, and this armature being fastened upon the outer end of a lever, 1, said lever will be rocked or tilted upon its fulcrum in such a manner as to cause its pivoted tail-piece 2 to drop down sufficiently far to be struck by one of the teeth of the revolving ratchet P.

We have already seen that the sleeve or collar K is provided with a hinged spring-actuated pawl, Q, adapted to engage the ratchet P, and thereby cause sleeve K and the shaft G to revolve together. When, after having completed a single revolution, that part of sleeve K upon which the pawl is hinged again reaches the fixed cam 3, Fig. 23, the tail 4 of pawl Q will strike against the concave head of the cam, and the pawl will thereby be tilted so as to release or become disengaged from rack P, whereby, of course, sleeve K is disengaged or uncoupled from the revolving drive-shaft G. As, however, sleeve K would still have sufficient momentum to make a turn or part of a turn after pawl Q has been released, I prevent this and cause sleeve K to come to a sudden and instant stop by means of an arm, 5, which is fastened upon a rock-shaft, 6, hung in suitable bearings underneath the bed-plate of the machine. As the pawl strikes the upper end of this arm 5, the motion of the sleeve to which the pawl is attached will be checked by the contact, the pawl acting in the same manner as a brake, so to speak; but as this might not of itself be sufficient to bring sleeve K to a complete stop, and as it is of the utmost importance that the mechanism should stop always in a certain fixed position, another arm (designated by the numeral 7, Figs. 16, 17, and 22) is keyed or otherwise fastened upon the rock-shaft 6, and at the proper moment, by the tilting of the rock-shaft, the upper end or head of this arm 7 will be brought up against sleeve K, so as to engage a catch or projection, 8, upon the same, and thereby bring it to an absolute stop.

Fastened upon the same rock-shaft, 6, as arms 5 and 7, so as to rock or move in unison with these, is a third arm, 9, Figs. 16, 17, and 20, the curved head 10 of which is forked to adapt it to receive the free end of the hinged tail-piece 2 of lever 1, when said tail-piece is pushed against it by coming in contact with the teeth of the revolving ratchet P. As in this manner the free end of arm 2 is pushed against the free end of arm 9, (which can happen only when that end of lever 1 upon which arm 2 is hinged is depressed by its other end being attracted by the electro-magnet,) said arm 9 is pushed back so as to tilt the rock-shaft 6, thereby simultaneously tilting back the stop-arms 5 and 7 and releasing the latter from the catch 8. At the same instant pawl Q will engage the ratchet, and thus sleeve K will make a single complete revolution, again coming to a stop at the completion of the revolution when pawl Q strikes the fixed arm 3.

Arms 5, 7, and 9 are brought back into their operative position at each revolution of sleeve K by means of a cam or eccentric, 11, Fig. 23, fastened upon said sleeve in such a manner as to engage or strike against an arm or tappet, 12, keyed upon the rock-shaft 6. To prevent backlash of said rock-shaft 6, sleeve K is provided with a secondary cam, 13, Figs. 17 and 20, having a projecting flange, 14, which, as the sleeve rotates, will overlap and slide over the curved head 10 of arm 9, thereby preventing backward motion of said arm and of the rock-shaft till the proper moment. This cam also, by striking against the under side of an offset, 15, on the hinged arm 2, (see Fig. 17,) operates to disengage the lower end of said arm from the ratchet-teeth if by any accident the electro-magnets should fail to operate promptly in letting go of the armature Z after the circuit has been broken.

From the foregoing it will be seen that the sleeve K will perform a single complete revolution every time lever 1 is tripped by an electric current passing through the electro-magnet, and then again come to an absolute stop at the initial or starting point. It will also be seen that the only function of the armature-lever 1 is to drop arm 2 low enough to be caught by one of the teeth of the revolving ratchet P, at which point the motive power of the machine comes into operation, so that a very weak electric current will be found sufficient for all practical purposes—*i. e.*, one that will excite the electro-magnets sufficient to attract the armature, and thereby tilt the lever on its fulcrum. For this purpose a single battery-cell of any approved construction will answer very well for the electric generator W; or a small dynamo may be used, deriving its motion from the drive-shaft G by any suitable gearing.

Instead of connecting one of the wires from the generator to screw X, as shown in Figs. 8 and 18, this wire may be connected to the metallic tap 16, Figs. 18 and 19, on which lever S is balanced, in which case said tap should be insulated from the rest of the machine. This would make the electric current more direct and avoid the leakage of energy incident to sending the current through the entire machine.

We have now seen in what manner an intermittent rotary motion is imparted to the sleeve K, which I shall call the "drive-sleeve," and, through it, to the intermeshing cone-pinions L and M and the cam O. We have also seen that these parts will each of them make a single complete revolution every time an electric impulse is sent through the electro-magnet, and we have seen that such an impulse or current is sent through the magnet every time the bent tail T of lever S touches the contact-plate U. The next step in order will be, therefore, to describe in what manner this lever S is tripped, and also the results produced by this tripping through the drive-sleeve K and drive-cam O, from which the movable parts of the type-setting mechanism proper derive their motion.

The compositor, standing in front of his case, picks up his type, using both hands for the purpose, and drops the types in their proper order or succession into the funnel or hopper R. This hopper is of such a shape and of such dimensions that the type will go through it lengthwise, no matter how it has been thrown into it at the upper end or mouth. As the type escapes lengthwise through the cylindrical guide or extension 17 at the lower end of the funnel, it falls into a trap or receptacle, 18, Figs. 9, 17, and 18, the bottom of which is formed by the rear end of the delicately-poised trip-lever S. The weight of the type will tilt or trip the lever, and one revolution of cam O is the instant result, after which the machine again comes to an absolute stop.

The moment that cam O commences its motion the following mechanism, which derives its motion from said cam, comes into action: Upon the face of the grooved cam O is fastened an upwardly-projecting crank-pin, 19, Figs. 6, 7, 12, 31, 32, and 33, near the upper end of which a movable arm, 20, is fastened. Attached to the same crank-pin, 19, above arm 20, is a connecting rod or pitman, 21, the other end of which is connected at the point marked 23 movably to the reciprocating slide 22, Figs. 6, 7, and 8, and it follows that at each revolution of cam O this slide or slide-bar 22 will make one motion forward and back. Upon a tap, 24, fixed in the bed of the machine, Figs. 6, 7, 8, and 12, swings a curved arm, 25, the forward or free end of which is provided with a roller, 26, which works in the groove or channel 27 of the drive-cam O. The sliding bar 22 is provided with a cross-head forming two guide-arms, 31 and 32, projecting in opposite directions and at right angles to the bar, and the upper one of these guide-arms, 31, slides in a bearing, 29, upon the forward part of the movable arm 25, while the opposite and lower guide-arm, 32, projects into a grooved guide piece or bearing, 30, which is suitably fixed to the frame of the machine, Fig. 15.

The pitman 21 and roller 26 (at the free end of the oscillating arm 25) are so arranged relative to each other and to the cam O, from which they derive their motion, and this cam is so constructed, that when the slide-bar 22 (which is actuated by pitman 21) makes its stroke forward and back the roller 26 of arm 25 will work in that part of the cam-groove 27 which is concentric to the cam, thus keeping said arm and the bearings 28 and 29, which are attached to it, stationary, while slide-bar 22 completes its stroke forward and back; but the moment roller 26 passes into the eccentric part of the cam-groove arm 25 will be tilted once forward and back with its free end. This happens at the beginning and end of each stroke of the reciprocating slide-bar 22. To the outer end of this bar is fastened, at right angles, a projection, 33, Figs. 7, 31, 32, and 33, which has a shoulder or offset, 34, on one side, operating, in conjunction with a similar offset, 35, on arm 20, to turn the type into a sidewise position if it happens to come through the funnel edgewise. This turning operation is performed by the shoulder 35 on arm 20 while the hub or pivot 19 of said arm or finger is moving in a circular track, as hereinbefore referred to, and indicated on Figs. 31 to 33 on Sheet 15. The body of the type is grasped during this operation between the fixed sill or frame-piece 37 and a spring-actuated arm or holder, 38, Figs. 7 and 34, which is pivoted upon a pintle, 39, fixed in the bed of the machine, and is provided with an arm, 40, the free end of which will strike a stud, 41, fixed in the face of the drive-cam O once during each revolution of said cam. This will happen at the exact moment when the type, having been turned into its proper position by the shouldered arms 33 and 20, is ready to start on its travels for the purpose of undergoing the other operations to which it is to be subjected in the machine, and as the stud 41 strikes the free end of arm 40 the holding-arm 38 will be tilted out of the way, or away from the fixed sill 37, thus releasing its hold upon the type.

In order to hold the type in the trap as it is received through the funnel, before and during the operation of turning it, (if turning of it is necessary,) I employ a small gate, (shown at 45 in Figs. 7 and 34.) This gate consists simply of a plate bent into the shape shown more clearly in the detail view, Fig. 34, hinged at one side upon a small pin, 46, which is fixed in the frame of the machine, and actuated by a spring, 47, in such a manner as to confine the type until it is released from the trap to commence its journey through the machine.

The type having been received in the trap at the lower end of the funnel resting in the gate just described, with its bottom pressing against the lever which starts the operating mechanism, and the machine commencing its motion, as hereinbefore described, the operation of the shouldered arm 33 will be to push the type sidewise through the gate, and at the same moment the shouldered arm or finger 20 will be brought up against the other side of the type by a roller, 43, which is hung in a bracket, 44, projecting from the arm 20, engaging a cam, 42, which is fixed upon the reciprocating slide-bar 22. This will be the position of the type indicated in Fig. 31. When arm 20 moves backward, as indicated by the arrows in Figs. 31 and 32, the type will be brought into its sidewise position (shown in Figs. 32 and 33) by giving it one-fourth of a turn, provided the type is received in the trap in the position indicated in Fig. 31; but if, on the other hand, the type should be received in the trap in the position indicated in Fig. 32, then its position will not be changed or affected by arms 33 and 20, for the reason that the shoulder or offset 35 in arm 20 will not reach and engage the corner of the type when it is in that position. Thus it will be seen that the type will always start on its journey through the machine with its greatest width in the proper direction—i. e., the body of type facing edgewise to the fixed sill 37—without regard to the position in which it may be received in the trap as it falls through the hopper.

I have already referred to arm 38 and its function, and by reference to Fig. 34 it will be seen that said arm is bent in such a manner as to make room for the hinged gate 45. It will further be seen that said arm is provided with a laterally-projecting rib or feather, 48, on its inner side, facing a corresponding rib, 49, which projects laterally from the fixed sill or frame-piece 37. These ribs are so arranged that either the one or the other will engage or fit into the nick of the type after it leaves the gate, according to which way the nick happens to be turned. Thus in Fig. 25, Sheet 15, a type is shown the nick of which is engaged by the rib 48 of arm 38, while in Fig. 26 I have shown the type in such a position that its nick will be engaged by the rib 49 on the fixed frame 37.

As the nick in a type is always placed an unequal distance from the ends, and usually nearer the bottom than the face, as on the examples shown on Sheet 15, the nick, if the type happens to go right side up or face upward through the funnel, will fall a little below the level of the projecting ribs 48 and 49, and it becomes necessary to shove the type from the under side sufficiently high up to let its nick reach and engage either one of the ribs 48 or 49, in the manner described. This is accomplished by the device which I call the "pusher," and which is illustrated in detail in Figs. 26 and 27 on Sheet 15, and also denoted by the numeral 50 on Figs. 6, 7, 9, and 15, by reference to which the construction and operation of this device will readily be understood, as follows: A shaft, 51, is hung movably in bearings or boxes 52, forming part of the frame of the machine, and upon this shaft is placed a coiled spring, 53, one end of which is fixed in the shaft, while its other end bears against the under side of the pusher-arm 50, the collar of which works loosely upon the fixed shaft 51, so that the tendency of the spring is to force the pusher in an upward direction. The collar of arm 50, through which shaft 51 is inserted, has a limited play or motion upon said shaft, but will move with said shaft when the latter is turned or rocked in its bearings. A rocking or tilting motion is imparted to shaft 51 at stated intervals by means of a pitman, 54, one end of which is connected to an arm, 55, fixed upon and projecting downwardly from the rock-shaft 51, while its other end is pivoted upon a stud or pin, 56, fixed in the under side of the movable arm 25, Figs. 12 and 15. As the type in this position reaches the pusher, the free end of which is covered with a disk of leather, the motion of arm 25 will be such that it will pull on pitman 54 and arm 55, thereby moving the outer leather-dressed end of the pusher in an upward direction, and push the type up the required distance to enable its nicks to engage the ribs 48 or 49, as the case may be; but if, on the other hand, the type goes down through the funnel upside down or face downward, and is received in that position in the trap, its nick will be above the projecting ribs 48 and 49, and no engagement with these will take place. Consequently there is nothing to hold or lock the type between the parts 38 and 37 and prevent its upward motion if pushed from the under side. When the type is in either of the positions shown in Figs. 25 or 26, with its nick engaged, the spring 53, which controls the pusher-arm, will yield, and there will be no further upward movement of the pusher; but when the nick is not engaged, as in Fig. 27, the pusher will shove the type upward into the position shown in said figure. When in this position—i. e., when the type stands upside down—it will project so high above the parts 37 and 38, between which it is held, that as it continues to move onward it will strike with its projecting end a small stop or plate, 57, depending from an arm or bracket, 58, which is suitably fastened upon the frame, and projects inwardly from and at right angles to the same, Figs. 8, 15, 26, and 27; but before the type reaches this stop-plate it has been grasped between the jaws of the revolving pinchers or nippers, which I shall now proceed to describe, and which will be found illustrated in detail in Figs. 35 to 42, and also in part in Figs. 7, 12, and 15.

In bearings 59, fixed upon the cross-head or arm 31 of the sliding bar 22, is journaled a short shaft, 60, the rearwardly-projecting end of which is provided with a cogged segment, 61. (Shown more clearly in Fig. 12, and also in Figs. 39 to 42.) The cogs or teeth of this segment are adapted to engage a toothed rack, 62, which is fixed upon arm 25, and when the cogs or teeth of this segment engage the downwardly-projecting teeth of arm 62 a one-half revolution will be given to the pincher-shaft 60. Upon the other or forward end of shaft 60 is a fixed jaw, 63, opposite to which is a movable jaw, 64, which is fastened upon the outer end of an arm, 65, the inner end of which has a yoke, 66, which is pivoted upon a pin, 67, inserted transversely through shaft 60. A spring, 68, is so arranged as to press with its free end against said yoke in such a manner as to force the movable jaw 64 against the fixed jaw 63 with a light spring-pressure, just enough to hold a type between the two jaws and prevent it from slipping.

As the bearings in which the pincher-shaft 60 revolves are mounted upon cross-head 31 of the sliding bar 22, and move with the same and with arm 25, which carries bar 22 and controls the motion of the same, it follows that this pincher mechanism will reciprocate toward and from the fixed part 37 through the motion of arm 25 and the cam O, from which said arm derives its motion. At the moment when the type has reached the open space (shown on Fig. 34) at the end of arm 38 the pinchers will advance endwise, the jaws being kept in a vertical position and apart, so as to pass on both sides of the type. The vertical position of the jaws is caused by means of a light spring, 69, Fig. 7, fastened to any suitable part of the wooden frame in which the machine is placed, the free end of which is connected by a band or strap, 70, Figs. 7 and 12, the other end of which is fastened in or near the smooth or convex part of the cogged segment 61. This part of the segment also has a projecting screw head or stud, 71, which, by striking against a suitably-arranged stop, (not shown in the drawings,) will prevent the tension of spring 69 from pulling shaft 60 around so as to bring the pincher-jaws out of a vertical plane. As the jaws, while in this normal or vertical position, advance to seize the type, an upwardly-projecting lip, 72, upon the movable spring-actuated jaw 64 will strike edgewise against a fixed downward-projecting stud, 73, depending from the bracket 58, which also carries another downward-projecting plate, 57, to which I have already referred briefly. The lip 72 and the fixed stud 73 are both beveled at the point of contact, and as lip 72 strikes the stud and glides along the beveled side of the same the pressure of spring 68, which keeps the jaws closed, will be overcome, and the movable jaw 64 will be forced apart sidewise from the fixed jaw 63. In this position the pinchers straddle the type, with one jaw on each side, closing in upon the type, so as to hold it firmly between the jaws after the pin or lip 72 has slipped past the beveled stud 73, which allows the movable jaw 64 to spring back into its closed position. The type is now grasped in a vertical position between the two jaws of the pinchers, and if the type stands with its face upward, and of course does not require to be reversed, all the pinchers are called upon to do in that case is to carry the type onward while holding it in the same vertical position, right side up. When the type is in this (correct) position between the jaws, its upwardly-projecting end is so low that it will not strike the downwardly-projecting plate 57, but will pass under the same, Figs. 26 and 35; but if, on the other hand, the type is received between the pincher-jaws upside down, or in the position indicated in Figs. 27 and 36, the pinchers, in addition to moving the type a certain step onward in its course through the machine, will have to reverse the type and bring it right side up, with face upward. This is accomplished in the following simple manner: As the type is carried forward by the pinchers, its projecting end will strike the downward-projecting plate 57, Fig. 36, thus giving a tilt to the pincher-jaws, and bringing them, as well as the type held between them, into a slanting or oblique position. This of course also tilts or rocks the pincher shaft 60 slightly, but enough to so turn its cogged segment 61 as to move the teeth of the same in an upward direction and cause them to engage the downwardly-projecting teeth or the rack 62, Fig. 12. This gives a one-half revolution to the shaft, which turns the pincher-jaws, holding the type between them, from the position shown in Figs. 36 and 39, first into the horizontal position shown in Figs. 37 and 40, and finally, at the end of the stroke, into the reversed vertical position shown in Figs. 38 and 41, the revolving jaws moving in the direction indicated by the arrows in Figs. 37 and 38, and in this last-named position the body of the type will have been reversed and is now standing right side up, or with its face pointing upward. At this stage the pinchers with the type between their jaws will have crossed on their onward motion the open space shown in Fig. 34 and arrived at the spring-actuated arm 74, the construction and operation of which is substantially the same as that of arm 38 at the other end of the open space just referred to. Like arm 38, this arm 74 has an inwardly projecting rib or feather, 75, which corresponds to a similar inwardly-projecting rib or feather, 76, on the fixed frame 37. In other words, the rib 75 may be considered simply as an extension of the rib 48 on arm 38, while the rib 76 may in like manner be considered an extension of the rib 49 on the fixed frame 37, there being simply a break or open space between these parallel ribs at the point traversed by the pinchers, which carry the type from the end of arm 38 and ribs 48 and 49 to the beginning of arm 74 and ribs 75 and 76, Figs. 28, 29, and 34, Sheet 15. The rib 75 in arm 74 is, however, provided with a small shoulder or offset, 77, and rib 76 has a similar shoulder or offset, 78, some distance back of the other offset, 77, and the function of these two abrupt shoulders or offsets will be described in their proper place later on.

As the type reaches arm 75 the oscillating arm 25 will have commenced its retrograde movement, actuated by the drive-cam O, and the pinchers will be gradually withdrawn, still, however, holding the type between their jaws; but the type has now been reversed, as we have seen, and it follows that its projecting end will point in a downward direction, as shown in Fig. 38. In this position the projecting lower end enters the narrow channel between arm 74 and the fixed sill or frame 37, Fig. 34, where said projecting lower end is grasped by the outer end of the spring-actuated arm 74, and held with sufficient pressure up against sill 37 to permit the jaws to slip off the type as the pinchers are being withdrawn in a direction at right angles to frame 37, owing to the retrograde movement of arm 25, as hereinbefore stated. As the pincher-jaws slip off of the type, which is now held in the position indicated in Figs. 28 and 34, the pincher-spring 68 will again close the movable jaw 64 up against the fixed jaw 63, and in this position the pinchers will return to their initial or starting point, ready to seize and operate upon the type next in order; but, as will be seen by reference to Fig. 28, the nick of the type projects below the ribs in the holding parts 74 and 37, and the type must be pushed up from below a sufficient distance to cause its nick to register with and engage either the one or the other of the said ribs. This is done by another pusher, 79, Figs. 6, 7, 8, and 29, which is constructed and operates precisely in the same manner as the other pusher, 50, which has already been fully described in connection with the ribbed arm 38, this pusher 79 being simply a duplication of pusher 50. (Shown in Fig. 27.) By the leather-covered disk on the end of the pusher-arm 79 the body of the type will be pushed up from the under side until its nick engages with one of the ribs, 75 or 76, so as to assume the position shown in Fig. 29. All that now remains to be done is to bring the type into its correct position will be to have the nick face the proper way, so that the letter will be printed right side up. The nick in a type is always at the "foot" or bottom side of the raised letter on the "face," and it is important, therefore, that the nicks in a row of type be all turned in the same direction; otherwise some of the letters will be printed upside down. The next step in the operation of the machine will be, therefore, to turn all the nicks a uniform way without regard to whether the nick, when the type has arrived at this stage and stands in the position shown in Fig. 29, engages the rib 75 on arm 74 or the rib 76 on the fixed frame 37, as in the example shown. This is done simply by giving the body of the type a one-quarter turn, so as to turn it sidewise. Now, by looking at Fig. 34, it will be seen that if the type stands in such a position as to have its nick engaged by rib 76, as shown in that figure, and it is then, while in this position, pushed in the direction of the arrow, it will pass by the offset 77 in the rib 75, with its nick sliding on the opposite rib, 76, until it reaches the shoulder or offset 78 near the end of said rib, when it will be turned sidewise by striking this offset in such a manner as to bring its nick to the left; but if, on the other hand, the type stands in the reverse position, with its nick facing and engaging the rib 75 on arm 74, then, as it is pushed onward, one corner of the type will strike the shoulder or offset 77 in said rib, and the type will be given a one-quarter turn to the left, turning it sidewise, so as to have its nick face to the left, the same as the preceding type. Thus it will be seen that the function of these shoulders 77 and 78 is to so turn the types that all the nicks shall point the same way. The types will then be in condition to be fed into the gutter or channel which carries them to the composing-galley, and in which the row of type is divided into lines of proper length; but before describing this part of the machine it is proper to describe the mechanism whereby the type is pushed along between the ribbed and shouldered parts 74 and 37, which have just been described, and whereby it is fed into the type-gutter. This mechanism or carrier is shown on the plan view Fig. 7, and is illustrated in detail in Figs. 35 and 42 to 45 on Sheet 16, to which reference should now be had.

Upon the reciprocating slide-bar 22, near the cross-head 31, which carries the revolving pincher mechanism, is fastened a post, 80, upon which is pivoted a forked arm, 81, actuated by a spring, 82, which is coiled around and fixed upon post 80 below the fork in such a manner that the short arm 83 of the fork will be forced with its outer beveled end against a beveled guide-block, 84, fastened upon the top of the sill or frame-piece 37, Fig. 8. The long arm 85 of the fork is provided at its outer end with a vertical pin, 86, adapted to engage or bear against the pitman 21, by which the slide-bar 22 is actuated, Fig. 7.

Upon the under side of the long arm 85 is pivoted at 87 a curved shoe, 88, (indicated in dotted lines,) the free end of which is bent upwardly at right angles and forms a stud, 89, fitting into a recess in the corresponding part of arm 83. By a suitably-arranged spring, (indicated at s' by dotted lines in Figs. 42 to 45,) which bears with its free end against the free end of the shoe 88, the upwardly-projecting stud or part 89 of said shoe is normally held in the position indicated in Figs. 42 and 43— that is to say, at the opening or mouth of the recess in arm 83; but by a certain amount of pressure against its front side or face it will yield and assume the position within the recess which is indicated in Figs. 44 and 45.

While the type is being held between the parts 37 and 74 it is pushed forward in the direction of the arrow in Fig. 34 by the short arm 83 of the fork, or rather by the projecting stud or shoe 89, which bears against it sidewise, as shown in Fig. 43, the fork itself being impelled by the return-stroke of arm 22. At the end of the stroke the short recessed arm of the fork will just deposit the type carried forward by it just in front of the inlet 90 to the type-gutter 91, and at this exact point arm 22 will start on its return-stroke actuated by the pitman 21 and cam O. As the pitman moves it will strike against the upwardly-projecting pin 86, Fig. 7, on arm 85, and thus tilt the fork and its appurtenances a little to one side, causing it to let go of the type, which is now ready to be pushed into the type-gutter in its proper place and position by means of the pusher-bar 92, which will be described presently.

The object of making the stud or shoe 89, which carries the type onward, yielding instead of rigid will readily be understood by reference to Figs. 44 and 45 on Sheet 16. If this stud were rigidly attached to the short arm 83, by which the type is pushed forward in the space or channel between the parts 37 and 74, the type as it strikes either one of the off-sets 77 or 78 in said channel would be likely to come to a stop; but at this point the resistance will cause the pushing part 89 to yield, thereby enabling the type to turn readily into a sidewise position, in which position it is ready for the action of the pusher-bar, which pushes it into the type-gutter as follows: Upon a stud, 93, on the oscillating arm 25, Figs. 6, 7, 12, and 13, is pivoted a bar, 92, against one side of which presses a spring, 94. The forward or free end of this bar extends transversely across the intermediate bar, 22, and its pitman 21 to the opening 90, which leads into the type-gutter 91, so that on the downstroke of arm 25 the end of the pusher-bar 92 will press the type which stands directly in front of it into the gutter, thereby forcing the whole row or column of type in the gutter forward a space corresponding to the width of one type. This completes the operation of the machine so far as placing the type in its proper position for printing is concerned, and all that now remains to be done is to divide the row of type as it is being formed in the type-gutter 91 into lines of proper length, uniform or otherwise, by means of the breaks to which I have already referred briefly in the general description of the machine at the beginning of the specification; but before proceeding to describe this part of my invention it may be proper to state that in all cases in the foregoing description where I have referred to "spring-actuated" arms I desire it to be understood that I do not confine or limit myself to any particular style or arrangement of spring, and for this reason in some instances the springs have not been shown in the drawings. The form of spring preferred is, however, shown in some cases—e. g., on Figs. 8, 9, 13, and 14, the numeral 95 denotes the spring which actuates the ribbed arm 74 and presses the same up against the fixed ribbed part 37, and 96, Fig. 9, denotes the spring which in like manner presses the other ribbed arm, 38, up against the fixed ribbed part 37; but, as above stated, other forms of springs may be used which will answer the purpose equally as well.

We now come to the consideration of the type-gutter, the use of the breaks, and mechanism in connection therewith, reference being had in this connection more particularly to the perspective views, and also to the details illustrated in Figs. 10, 11, 46, 47, and 48.

A post, 97, is pivoted with its lower end in the bed-plate of the machine, and with its upper end in the table or frame which supports the hopper R. Upon this post is fastened adjustably, by means of a binding-screw or set-screw, 98, an arm, 99, which projects at right angles, and is provided at its outer end with a hinged spring-actuated dog, 100, terminating in a bent lip or pawl, 101. In Fig. 11, the numeral 102 denotes the spring, one end of which is fastened upon arm 99, while its free end bears against a right-angled lip upon the dog in such a manner as to cause the lip 101 at the outer end of the latter to bear against the row or column of type placed in the gutter 91. Another arm, 103, is similarly fastened adjustably upon the post 97 by means of a binding-screw, 104, some distance above the lower arm, 99, and the outer end of this arm 103 is connected by a cord, 105, passing over suitably-arranged sheaves or pulleys to a weight, 106, which slides in a groove on one side of the copy-holder 107. Thus it will be seen that the weight 106, by its cord 105 and the arm 103, will cause the dog 100 of arm 99 to bear with a certain amount of pressure against the row of type in the gutter. If, as the type is pushed on forward in the gutter by the addition of new type at the inlet, a type should be reached the body of which is narrower than the rest, as is the case with the breaks shown at $b$ in Figs. 10 and 11, it follows that the end of the lip 101 will slip into the narrow open space thus formed and carry arm 99 with it as the row of type advances, thus gradually turning the post 97, with its fixed arm 103, and thereby gradually, by pulling upon the cord 105, raising the weight 106, which slides in a groove on one side of the copy-holder. At this point it is proper to state that the breaks hereinbefore referred to are simply ordinary type-bodies, of type-metal, brass, or any other suitable material, of the same general dimensions as ordinary type, but without any nicks, and preferably a little longer than the common "sorts" of type. As these breaks are without nicks, they will always pass through the machine so as to come out in the type-gutter standing sidewise, as shown in Figs. 10 and 11, in relation to the other regular type, which stands endwise, thus leaving a narrow notch or opening (denoted by the letter $a$) between each break $b$ and the two adjacent types, one on each side.

At a suitable place upon the type-gutter, the location of which depends upon the length which the lines are to have, is fastened by means of a set-screw, 109, a clamp, 108, having a wedge-shaped shoe or projection, 110, the incline or bevel of which is in the direction of arm 99. As the free end of this arm gradually advances toward the clamp, impelled by the slowly-advancing column of type, the free end of the hinged spring-actuated dog 100 will ultimately reach the wedge 110, by which it is tripped, thus releasing the lip 101, when the arm, impelled by the weight at the end of the cord, will fly back to its normal position at the mouth of the type-gutter, and thereby indicate, by the sudden dropping of the weight, that it is time for the compositor to divide his line by dropping another break into the funnel. Meanwhile the row of type continues to advance slowly in the gutter in the direction of the composing-galley, (shown at 111,) which is simply a rectangular frame provided with a series of parallel transverse partitions, whereby it is divided up into a row of parallel transverse type channels or compartments, 112, of even width. This galley is adapted to slide by its own weight down an inclined board, 113, which is provided on one side with a flanged guide-rail, 114.

Upon a bracket-plate, 115, projecting laterally from the inclined board or galley support 113, is fixed an upwardly-projecting short post, 116, upon which is pivoted a lever, 117, which moves in a plane parallel to plate 115. The short arm of this lever is connected by a spring, 118, with the fixed support 113, and upon the extreme outer end of the long arm is a pin or stud, $124^a$, upon which is pivoted a dog, 119, the curved and bifurcated outer end, 120, of which is impelled by a spring, 121, against the column of type in the type-gutter. The upper curved end, 120, of the bifurcated dog has a hook-shaped catch, 122, while the lower arm simply terminates in a curved hook, 123, having a sharp point. Another spring-actuated arm or dog, 124, is pivoted upon a pin, 125, on the lever 117, and has its outer end bent to form a two-fingered pawl, 126, the two curved prongs or points of which fit between the forked arms 122 and 123 of arm 119, as will appear more clearly by reference to Figs. 46 and 48. These two pivoted and spring-actuated dogs or pawls 119 and 124 constitute the feed mechanism proper, whereby the row of set type is pushed into the channels of the composing-galley line by line, in the manner hereinafter described, and the remaining two pawls, 127 and 128, which are pivoted, respectively, upon the studs 129 and 130, constitute the mechanism for regulating the intermittent downward motion of the sliding galley as the channels of the same are being gradually filled with type. These arms or pawls 127 and 128 are pivoted on opposite sides of the fulcrum 116 of lever 117, and it follows that by the movement of said lever they will alternately work with the shoes 131 and 132 at their free ends sidewise into the channels of the galley. The shoe 131 of arm 127 bears with its flat back part against a pin or roller, 133, fixed in the bed-plate 115, and the shoe 132 of the other arm, 128, bears and slides upon a projection on the front side of shoe 131, which it overlaps. The guide-rail 114 on the fixed board or slide 113 is slotted or cut away at the point where the free ends of the four arms 119, 124, 127, and 128 converge, so that the devices at the outer ends of said arms may have free access to the type-receiving channels in the sliding galley. A stop-pin, 134, fixed in the projecting bracket or bed-plate 115, upon which this mechanism is mounted, prevents the upper end of lever 117 from being thrown too far back by the tension of spring 118, which connects the outer end of its short arms with the fixed slide.

The operation of this mechanism is as follows: As the column of type on its way to the galley in which the continuous row is broken up into separate lines advances slowly against that particular channel which stands opposite to or registers with the type-gutter, with the prongs of arm 124 projecting into the notch or space formed in the row of type by one of the breaks, as shown on the plan view Fig. 10, the advancing row of type will carry arm 124 with it, thereby slowly moving the long arm of lever 117, to which this arm 124 is attached, in the direction of the galley. As arm 119 is attached to this lever 117 at a greater distance from the fulcrum 116 than arm 124, it follows that this last-named arm, 119, will move faster than arm 124, thus bringing its curved and hooked head to move in advance of the hook-shaped prongs of arm 124. As the hooks 122 and 123 of arm 119 press against the last type in the row preceding the break forming the notch or recess which engages the prongs of arm 124 and impels the whole mechanism, it follows that that part of the continuous row of type against which the head 122 presses will gradually become detached from the body of type forming the row on the other side of the break, said detached portion being pushed slowly in advance of the continuous column, so as to gradually increase the width of the open space between the two bodies of type. In this manner the detached row of type forming one line is shoved or pushed by lever 119 into its appropriate channel in the composing-galley until the last type in the row has just passed beyond the slotted guide-rail 114, against one side of which the galley rests. At this point, that being the terminus of a line, another break will occur in the continuous column of type, indicating the beginning of a new line, and at precisely the same moment arm 124 will have advanced so far as to cause a beveled projection, 135, on arm 124 to strike against a pin, 136, Figs. 46 and 48, fixed in the bed-plate 115, whereby the head of arm 124 is pushed to one side out of the way, so as to release its prongs from the notch in the column of type, and as arm 124 is thus disengaged from the row or column of type it will also disengage arm 119 by striking against its inner side, thus releasing both heads of arms 119 and 124, respectively, from contact with the type. At the same moment the retaining-pawls 127 and 128 will be in such a position as to release their hold upon the galley, thereby allowing it to drop by its own gravity upon the inclined slide a distance corresponding to the width of one of the type-channels, thus lowering the channel just filled with type one space, and bringing a fresh or empty channel opposite to the feed mechanism and the continuous row of type, from which another section or line will presently be detached in the same manner, and so on till the galley has been filled.

In order to avoid the jar which might result from the sudden dropping or lowering of the galley, especially when partially filled with type, the full width of a channel at once, or by a single operation, I cause each lowering or dropping of the galley to be made in two separate movements, the galley dropping or sliding during each of these movements for a space corresponding to half the width of a type-channel only. It is with this object in view that I employ two alternately-reciprocating retaining-dogs, 127 and 128, the free ends of which, as they engage the sliding galley, play on opposite sides of the transverse partitions by which the type channels are formed, the galley dropping half a space or channel width at each vibration of the lever 117.

In composing matter in the English language a "space" or blank type is used for every sixth letter, on an average, for the purpose of dividing the words from one another. These spaces may occupy compartments in the cases or type-trays, as usual, from which they may be fed into the hopper by hand, the same as ordinary type, whenever wanted; but in order to save time in the use of the space, which occurs so frequently, I have devised a very simple attachment to my machine whereby the spaces may be placed directly in their proper places in the type-gutter without passing through the machine at all, and I shall now proceed to describe this attachment, the construction and operation of which will be readily understood by reference to Figs. 5, 6, 7, 8, 9, and 11.

An auxiliary gutter or magazine, 137, is used, which is filled with spaces or space-type of even size pressed against by a spring, 138, arranged in the rear portion of the magazine, so that the spring will exercise a continuous pressure against the row of type in the magazine, thereby forcing the first space in the row—*i. e.*, the one next in order to be fed into the machine—up against an offset or shoulder, 139, in the magazine-channel. At this point the channel is narrowed, as shown at 140, so as to correspond to the narrowest width or thickness of the type, so that this may be pushed into the reduced chute or channel sidewise, and through the chute 140 into the type-gutter 90 91, into which said chute opens, as will be seen more clearly by reference to Figs. 6 and 7. In the last-named figure I have indicated by the small arrows the direction in which the spaces are pushed sidewise into the channel 140 by means of the shoe or pusher 144, which is of such dimensions that it will freely permit the space next in order to be pushed into the channel to slip up into its proper position against the shoulder or offset 139 on the next movement of the pusher-shoe. The narrow channel 140 being filled with spaces impinging upon one another edgewise, one space after another will thus be operated upon successively, as occasion requires. This pushing of a space from the space-magazine 137 into the type-gutter through the chute 140 is done in the following manner: An elbow-lever or bell-crank, 141, Figs. 5, 8, and 9, is hung upon a fulcrum-pin, 142, suitably fastened in any convenient part of the frame, and provided with a knob, 143, at the outer end of its horizontal arm, said knob being so located as to be within easy and convenient reach of the operator standing in front of the machine. At the lower end of the vertical arm is a shoe or projection, 144, Fig. 8, projecting through a slot in one side of the magazine, just below the shoulder or offset 139, and it follows that when the knob 143 is depressed this shoe 144 (which is also indicated in section in Fig. 7) will enter the slot in the magazine with which it registers and push the space-type which stands up against the shoulder to one side, so as to clear said shoulder or offset and shove it into the reduced duct or chute 140. This being already filled with spaces, the space nearest the type-gutter is pushed into this edgewise in its proper place, while the spring behind the row of type in the magazine will press the whole column forward, thereby forcing a new space up against the shoulder 139 in place of the one which has been shoved into the reduced channel leading to the type-gutter. Thus it will be seen that by each depression of the knob 143 a space is fed into its appropriate place in the type-gutter 91. At each depression of the knob a suitably-arranged spring brings arm 141 back into its normal position, (see Fig. 7,) one form of such a spring being shown at $s^2$ in Fig. 8.

I have already in several places in the foregoing part of the specification briefly referred to the funnel-shaped hopper or chute into which the types are dropped one by one by the compositor, and through which they are fed to the "trap," where the initial performance of the machine takes place. In Figs. 49, 50, and 51 I have illustrated the construction of this hopper in detail, and by reference to these figures it will be seen that the funnel R is provided with an extension, $r$, on one side, forming a flaring guard, which will conduct any type that may fall upon it down into the hopper. The latter may be supported in any suitable manner upon and in front of the case or frame in such a manner as to be within easy and convenient reach of the compositor. By preference I insert the hopper through an aperture in a shelf or table, $t$, fastened upon the front side of the frame, and having an upwardly-turned flange or guard, as shown on the drawings. If any type should miss the mouth of the funnel or its guard $r$, they will fall upon this table, from which they may readily be picked up and put back into the funnel. The lower part of the funnel may be provided with a leg or support, $s$, which may be stepped into the frame of the machine, so as to fix the lower end of the hopper in its proper position relative to the trap in which the type is deposited as it starts on its travel through the machine.

The hopper R, with its guard $r$, is constructed of tin or any other suitable metal, and is lined with felt, $f$, which is in turn covered with smooth oil-skin or thin lacquered leather, $l$, with the smooth and glossy side facing the interior of the funnel. By these means I prevent the sharp corners of the type from being abraded or otherwise injured as they strike the sides of the funnel or the inclined guard $r$, the smooth inner side of which causes them to slip easily through the funnel without sticking.

Having now in the foregoing fully described the construction and operation of my machine for setting type, what I claim, and desire to secure by Letters Patent of the United States, is as follows:

1. The combination, in a type-setting machine, of a continuously-revolving drive-shaft, the described electrical mechanism adapted to operate the clutch mechanism, the tripping-lever for closing the circuit, and a hopper adapted to feed the type successively to said tripping-lever, whereby the electrical mechanism is operated intermittently, so as to cause an intermittent motion of the operating parts of the machine, substantially as set forth.

2. In a type-setting machine, the combination of the following mechanism: a tripping device or lever actuating an electrical appliance which starts the machine every time a type is fed into it, a pair of reciprocating notched fingers which seize the type and adjust it in a vertical position, a pair of revolving pinchers or jaws, whereby the type is adjusted with its face upward, and the spring-actuated shouldered arm and corresponding shouldered fixed sill, whereby the type is tilted sidewise, so as to always present its nick in the proper direction, all constructed and combined substantially as described.

3. In a type-setting machine, the combination of the following mechanism: a tripping device or lever actuating an electrical appliance which starts the machine every time a type is fed into it, a pair of reciprocating notched fingers which seize the type and adjust it in a vertical position, a pair of revolving pinchers or jaws, whereby the type is adjusted with its face upward, the spring-actuated shouldered arm and corresponding shouldered fixed sill, whereby the type is tilted sidewise, so as to always present its nick in the proper direction, and mechanism, substantially as described, for feeding the type from the machine to the composing-galley.

4. In a type-setting machine, the described mechanism for reversing the type if it is received upside down in the machine, which consists, essentially, of a movable arm having a projecting rib or feather on one side, adapted to engage the nick of a type, a fixed sill having a corresponding projecting rib, also adapted to engage the nick of a type, a spring pressing said movable arm against said fixed sill, and a pusher or lever adapted to push the type up from the under side until its nick shall engage either the ribbed arm or the ribbed sill, substantially as set forth.

5. In a type-setting machine, the described mechanism for turning the nicks of the type all in one direction, which consists, essentially, of a movable arm having a projecting rib and shoulder or offset on one side, a fixed sill having a corresponding rib, and also a shoulder or offset placed farther back than the shoulder on the movable arm, or at some distance from the same, a spring pressing said movable arm against said fixed sill, and a pusher or lever adapted to push the type up from the under side until its nick shall engage either the ribbed and shouldered arm or the ribbed and shouldered sill, substantially as set forth.

6. The combination of the electro-magnet, lever 1, having armature Z and hinged arm or tail-piece 2, drive-shaft G, having ratchet P, arm 9, and sleeve or collar K, provided with a spring-actuated pawl, Q.

7. The combination of the drive-shaft having ratchet P, loose sleeve or collar K, pawl Q, fixed cam 3, rock-shaft 6, arms 5 and 9, fixed upon the rock-shaft, and lever 1, having the hinged tail-piece 2.

8. The combination of the drive-shaft having ratchet P and cam 11, loose sleeve or collar K, pawl Q, fixed cam 3, rock-shaft 6, arms 5, 9, and 12, fixed upon the rock-shaft, and lever 1, having the hinged tail-piece 2.

9. The combination of the drive-shaft having ratchet P and cam 11, loose sleeve or collar K, having catch or projection 8, pawl Q, fixed cam 3, rock-shaft 6, arms 5, 7, 9, and 12, fixed upon the rock-shaft, and lever 1, having the hinged tail-piece 2.

10. The combination of the drive-shaft having ratchet P, loose sleeve or collar having flanged cam 13, pawl Q, oscillating arm 9, having curved head 10, and lever 1, having the hinged tail-piece 2.

11. The combination, with the drive-shaft and the described intermittently-operating clutch mechanism and electrical appliance, of the drive-cam O, pitman 21, reciprocating bar 22, and oscillating arm 25.

12. The combination of the intermittently-revolving drive-cam O, oscillating arm 25, having bearings for the reciprocating slide-bar 22, bar 22, sliding in said bearings and moving with the arm, and pitman 21.

13. The combination, with the fixed sill or frame 37, of the sliding bar 22, provided with arm 33, having shoulder 34, and movable arm or finger 20, having shoulder 35, said arm 20 reciprocating at right angles to the line of motion of the sliding bar 22.

14. The combination of the drive-cam having stud 41, vertical rock-shaft 39, provided with the spring-actuated arms 40 and 38, the latter having a projecting rib or feather, 48, fixed sill 37, having projecting rib 49, shouldered arm 33, and shouldered finger 20, substantially as set forth.

15. In a type-setting machine, the hinged gate 45, in combination with the fixed sill 37 and spring 47, whereby the free end of the gate is pressed against the sill.

16. The combination of the hopper, the lever S, the hinged gate, the spring which actuates said gate, the fixed sill 37, having the projecting rib 76 and shoulder or offset 78, and the pusher 50, constructed and combined to operate substantially as set forth.

17. In combination with frame or sill 37 and the reciprocating shouldered arm 33, the shouldered finger 20, provided with a laterally-extending bracket carrying a roller at its outer end, cam 42, and the reciprocating bar 22.

18. In combination with the reciprocating bar 22 and mechanism, substantially as described, for feeding and adjusting the type between the fixed sill and movable spring-actuated arm, the rock-shaft 51 and spring-actuated pusher 50, whereby the type will be pushed up between the fixed sill and its movable counterpart only high enough to cause its nick to engage the rib of either one of said parts, after which the pusher-spring will yield, substantially as and for the purpose set forth.

19. The combination, substantially as herein described and shown, of the rock-shaft 51, having the crank or arm 55, pusher 50, spring 53, pitman 54, and oscillating arm 25.

20. The combination, with the reciprocating slide-bar 22, of the described mechanism for reversing the position of the type, which consists, essentially, in a rotary shaft actuated by the strokes of the sliding bar upon which it is mounted, in combination with a fixed rack engaging cogs on the shaft and provided with a pair of jaws adapted to grasp and hold the type during the process of reversing it by the revolution of the shaft.

21. The combination of oscillating arm 25, having fixed rack 62, rotary shaft 60, provided with a cogged segment, 61, and having the fixed jaw 63, spring-actuated jaw 64, spring 69, and a band connecting the free end of said spring with the rotary shaft.

22. In combination with the described pincher mechanism mounted upon and moving with the reciprocating slide-bar, the fixed bracket provided with the beveled shoe or projection 73, adapted to strike or engage a projecting stud upon the movable jaw of the pincher-head, whereby the two jaws are forced apart as the head advances against the type to be operated upon.

23. The combination, with the described pincher mechanism for reversing the position of the type when required, of the fixed studs or projections 73 and 57, whereby in the first instance the jaws are opened as the pincher-head advances against the type to be operated upon, again closing upon the same after passing the projection 73, and, secondly, the type when held upside down between the jaws will strike against the secondary stop 57, and thereby tilt the pincher-shaft sufficiently to enable the teeth of its cogged segment to engage the teeth of the rack which is fixed upon the oscillating arm.

24. In combination with the described rotary pincher mechanism or reversing mechanism, the pusher 79 and mechanism, substantially as described, for operating the same.

25. The combination of the fixed and ribbed sill or frame 37, spring-actuated ribbed arms 38 and 74, rock-shaft 51, spring-actuated pushers 50 and 79, and mechanism, substantially as described, for rocking shaft 51 in its bearings.

26. The combination of the fixed sill 37, rib 76, shoulder 78, spring-actuated arm 74, rib 75, shoulder 77, forked device 81, spring 82, and movable spring-shoe 88, provided with the upwardly-projecting stud 89, all constructed and combined substantially as and for the purpose set forth.

27. The combination of the fixed ribbed sill 37, spring-actuated ribbed arm 74, pusher 79, forked carrier device 81, with its adjuncts, as described, and reciprocating slide-bar 22.

28. The combination of the sliding bar, the pitman connecting the same with the drive-cam, and the forked carrier device 81, pivoted on a post, 80, upon the sliding bar, and provided with an upwardly-projecting pin, 86, adapted to engage the pitman on the return-stroke of the sliding bar.

29. In combination with the ribbed and shouldered sill 37, ribbed and shouldered arm 74, and pusher 79, the forked carrier device 81, constructed and operating substantially as described, whereby the type held between said ribbed parts is pushed and given a one-quarter turn sidewise by contact with the shoulders or offsets in such a manner that all the nicks in a row of type will point in the same direction.

30. The combination of the oscillating arm 25, pivoted pusher-bar 92, reciprocating arm 22, carrying the forked device 81, fixed ribbed sill 37, shoulder 78, movable ribbed arm 74, shoulder 77, and type-gutter 91, substantially as and for the purpose set forth.

31. The removable and adjustable clamp 108, grooved or recessed transversely to fit the type-gutter, and provided on one side with a set-screw and on the other side with a wedge-shaped shoe or projection, substantially as and for the purpose set forth.

32. The combination, with the type-gutter, of the described adjustable clamp or clamping device adapted to fit the gutter and provided with a set-screw and wedge-shaped shoe or projection, as set forth.

33. In combination with the type-gutter and removable and adjustable clamp 108, constructed substantially as described, the post 97, provided with a laterally-extending arm, 99, having at its outer end a spring-actuated dog adapted to engage the notches or open spaces formed in the row of type in the gutter by the interposition of breaks, as set forth.

34. In a type-setting machine, the combination, with the copy-holder of the machine, of a sliding weight connected by a cord with and in combination with a device, constructed substantially as described, whereby the weight will be raised by intermittent steps as each successive type is fed into the type-gutter and again suddenly lowered to its normal position when sufficient type has been fed into the gutter to form a line of proper length.

35. The described mechanism for indicating to the compositor when he is to use a break for the purpose of closing one line of composed matter and commencing a new line, which consists, essentially, of the following elements: a wedge-shaped clamp adapted to be fastened upon the type-gutter and by the position of which the length of the line is determined, a dog or pawl engaging and adapted to be moved by the column of moving type in the gutter and to be released by contact with the aforesaid clamp, a weight suspended in front of the compositor, and mechanism, substantially as described, for connecting said weight with the movable pawl.

36. The combination of the weight, the cord, the adjustable arm 103, the post on which said arm is fastened adjustably, the adjustable arm 99, dog 100, type-gutter, and adjustable wedge-shaped clamp 108, all constructed and combined to operate substantially as and for the purpose set forth.

37. In combination with the inclined galley-support and sliding galley, the described mechanism for breaking the row or column of type up into separate lines and assembling the same in the galley, said mechanism consisting, essentially, of the spring-actuated arm or lever provided with the pivoted arms 119, 124, 127, and 128, constructed and combined to operate as set forth.

38. The combination of plate 115, lever 117, spring 118, and arms 119 and 124, pivoted on the lever on the same side of the fulcrum, but at unequal distances therefrom.

39. The combination of plate 115, lever 117, spring 118, and arms 127 and 128, pivoted on the lever on opposite sides of the fulcrum, and at equal distances therefrom.

40. In combination with the type-gutter and sliding galley, the arms 119 and 124, constructed and arranged as described, whereby a section of composed type comprised between two breaks is pushed into its appropriate channel or compartment in the galley in advance of the section next following.

41. In combination with the inclined galley-support and sliding galley, the alternately-reciprocating arms 127 and 128, having overlapping heads at their converging ends sliding upon each other, and bearing against a stud or roller projecting upwardly from plate 115.

42. In combination with the feed and dividing arms 119 and 124, the deflecting-pin 136, fixed in the bed-plate 115, whereby the heads of said arms are deflected and released from the column of type as it enters its proper channel or compartment in the galley.

43. The combination, substantially as described, of the type-gutter, space-magazine provided with the shoulder or offset 139, and reduced duct or channel leading from the shouldered part of the magazine into the mouth of the type-gutter.

44. In combination with the type-gutter in which the type is assembled from the machine, the duct 140, shouldered space-magazine 137, and elbow-lever or bell-crank 141, provided with a finger-piece and having a shoe or projection, 144, adapted to enter a slot in the space-magazine sidewise, substantially as and for the purpose set forth.

45. In a type-setting machine, the herein-described funnel-shaped hopper, constructed of metal or other suitable material, and having an inside lining of soft or yielding material, provided with a covering of material or fabric having a smooth and slippery surface, substantially as and for the purpose set forth.

In testimony that I claim the foregoing as my own I have hereunto affixed my signature in presence of two witnesses.

ALEXANDER LAGERMAN.

Witnesses:
JOHN GUSTAFSON,
GUSTAF EMIL FAST.